(12) United States Patent
Konopnicki et al.

(10) Patent No.: US 7,756,772 B1
(45) Date of Patent: Jul. 13, 2010

(54) SYSTEM AND METHOD FOR AUTOMATED CONTRACT FORMATION

(75) Inventors: David Konopnicki, Haifa (IL); Lior Leiba, Haifa (IL); Oded Shmueli, Nofit (IL); Yehoshua Sagiv, Jerusalem (IL)

(73) Assignee: Dealigence Inc., Dover, DE (US)

( * ) Notice: Subject to any disclaimer, the term of this patent is extended or adjusted under 35 U.S.C. 154(b) by 1786 days.

(21) Appl. No.: 10/069,234

(22) PCT Filed: Aug. 29, 2000

(86) PCT No.: PCT/IL00/00516

§ 371 (c)(1),
(2), (4) Date: Feb. 22, 2002

(87) PCT Pub. No.: WO01/16665

PCT Pub. Date: Mar. 8, 2001

(51) Int. Cl.
*G06Q 30/00* (2006.01)

(52) U.S. Cl. ............... 705/37; 705/26; 705/27; 705/38; 705/80

(58) Field of Classification Search .......... 705/26, 705/27, 36, 37, 38, 80, 35, 39, 40
See application file for complete search history.

(56) References Cited

U.S. PATENT DOCUMENTS

| | | | |
|---|---|---|---|
| 4,903,201 A | 2/1990 | Wagner | |
| 5,077,665 A | 12/1991 | Silverman et al. | |
| 5,136,501 A | 8/1992 | Silverman et al. | |
| 5,664,115 A | 9/1997 | Fraser | |
| 5,794,207 A | 8/1998 | Walker et al. | |
| 5,842,178 A | 11/1998 | Giovannoli | |
| 5,845,266 A | 12/1998 | Lupien et al. | |
| 5,924,082 A | 7/1999 | Silverman et al. | |
| 6,035,288 A * | 3/2000 | Solomon | 705/37 |
| 6,055,519 A * | 4/2000 | Kennedy et al. | 705/80 |
| 6,141,653 A | 10/2000 | Conklin et al. | |
| 6,401,080 B1 * | 6/2002 | Bigus et al. | 705/37 |
| 6,553,347 B1 * | 4/2003 | Tavor et al. | 705/14 |
| 6,968,318 B1 * | 11/2005 | Ferstenberg et al. | 705/37 |

OTHER PUBLICATIONS

Fikes et al. "Distributed Repositories of Highly Expressed Reusable Ontologies", www.kls.stanford.edu, 1998. Abstract.
Jannik et al. "Encapsulation and Composition of Ontologies", www.kls.stanford.edu. Abstract.
Konopnicki et al "Toward Automated Electronic Commerce", First IAC Workshoop on Internet-Based Negotiations Technologies, IBM, Watson Research Center, Yorktown Heights, N.Y., 1999. Abstract.

* cited by examiner

*Primary Examiner*—Nga B. Nguyen

(57) ABSTRACT

A system, method and device for (semi-)automated e-commerce on the Internet, the WWW and other networks. Trading parties present intentions, made of more elementary components, which are used to express their willingness to engage in deals subject to constraints. Parts of intentions may be variable components. Some variable components may be associated with computational devices that transform them, optionally communicating via messages, into more specified components. This mechanism encodes business rules. By fitting intentions, contracts are formed. While fitting intentions, negotiations are carried out via the exchange of messages. Negotiations are automated by encoding users wishes as mathematical programs. Following the deal formation an optional deal improvement phase, in one-to-one mode or one-to-many mode, is carried out to improve the deal. The improvement phase may be based on a trading mechanselected from an available collection of such mechanisms including such mechanisms as constructed by users of the system.

42 Claims, 12 Drawing Sheets

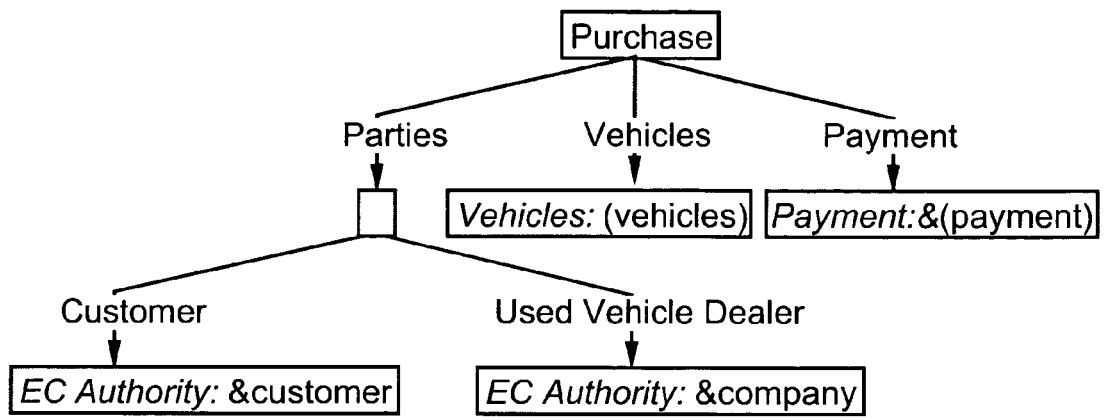
a) The Purchase Contract Class
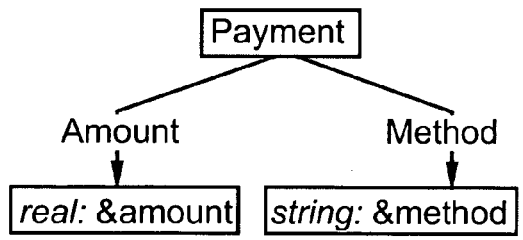
b) The payment class
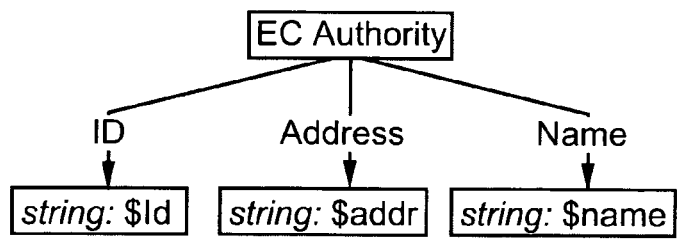
c) The EC Authority class
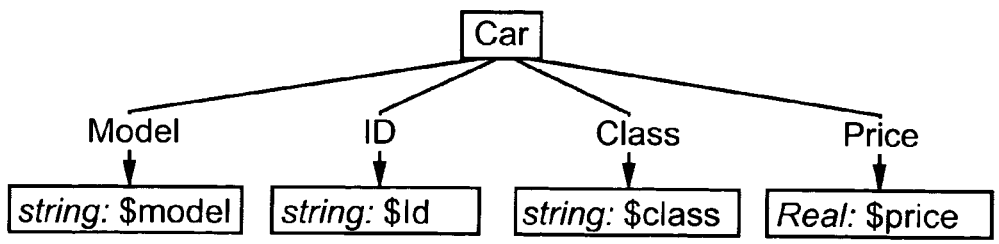
d) The Car Class
Fig. 1

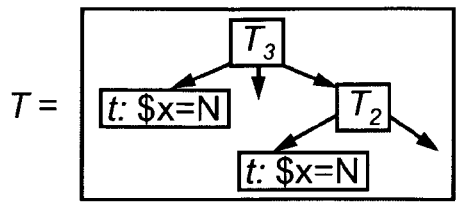 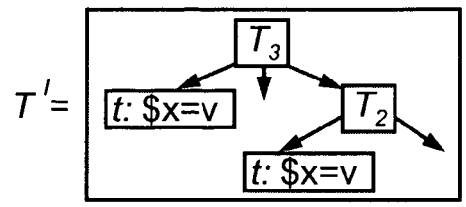

(a) $T'$ is tree resulting from the assignment of the atomic value v to atomic variable Sx in T

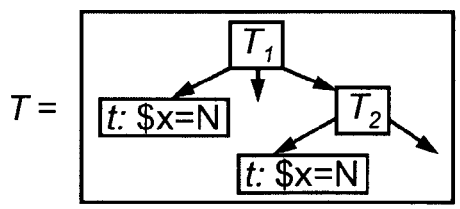 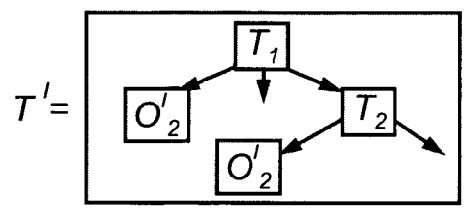

(b) $T'$ is tree resulting from the assignment of the instance $O'_2$ of type $t'$ to the class variable Sx in $T_1$. In $T'$ the root of $O'_2$ is labeled with the variable $(t: Sx = t')$

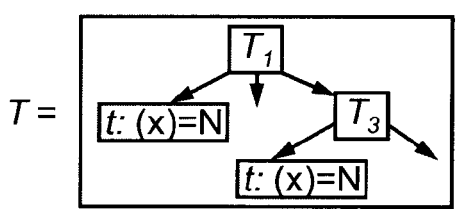 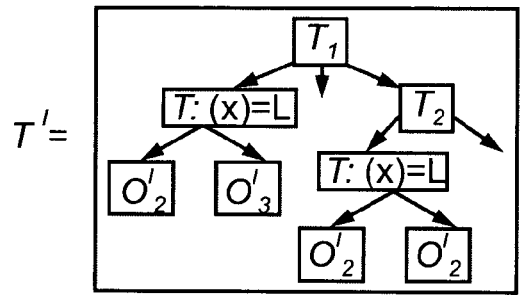

(c) $T'$ is tree resulting from the assignment of the list of instances $(O'_2, O'_3)$ to the class list variable(x) in T.

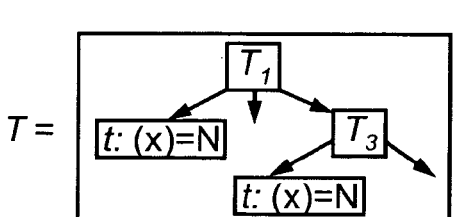 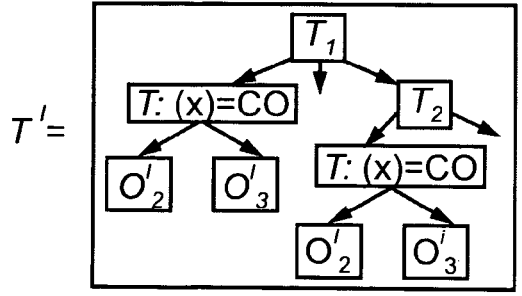

(d) $T'$ is tree resulting from the definition of the list containment constraint (x) $(O'_2, O'_2)$ in T.

Fig. 2

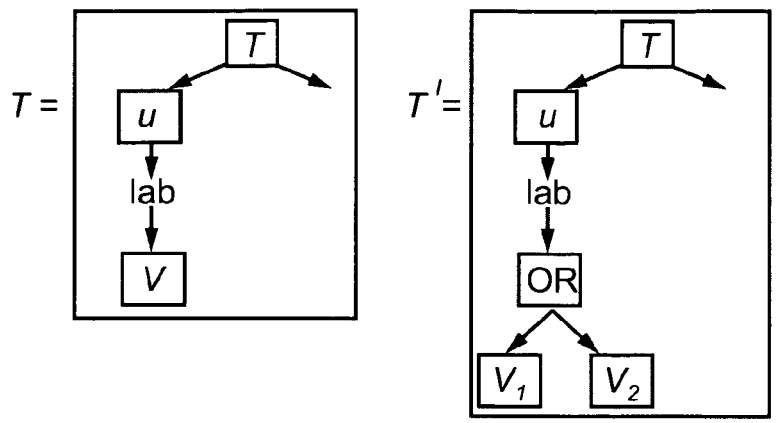
(a) $T'$ is the result of adding an OR vertex to $T$ - Note that $V_1$ and $V_2$ must be isomorphic to $V$ up to renaming of variables. Adding an AND vertex is done in a similar way.
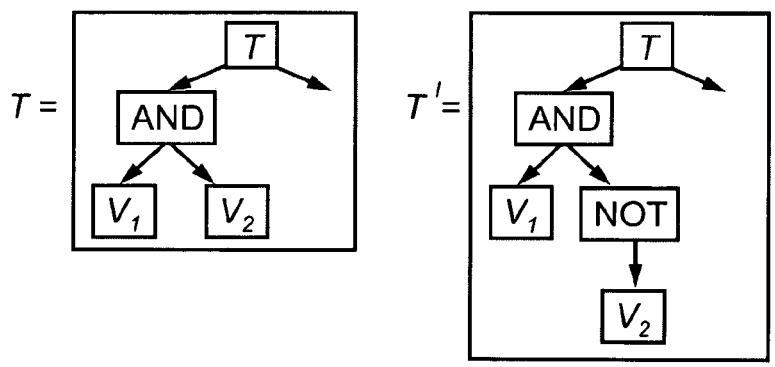
(b) $T'$ is the result of adding a NOT vertex to $T$ - Note that NOT vertices can be added only subtrees rooted at an AND vertex
Fig. 3
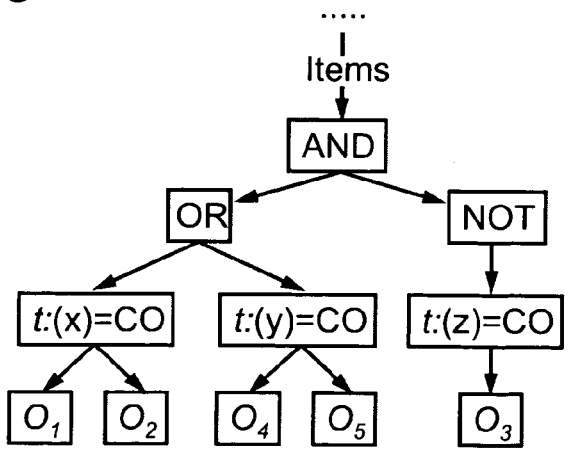
Fig. 4

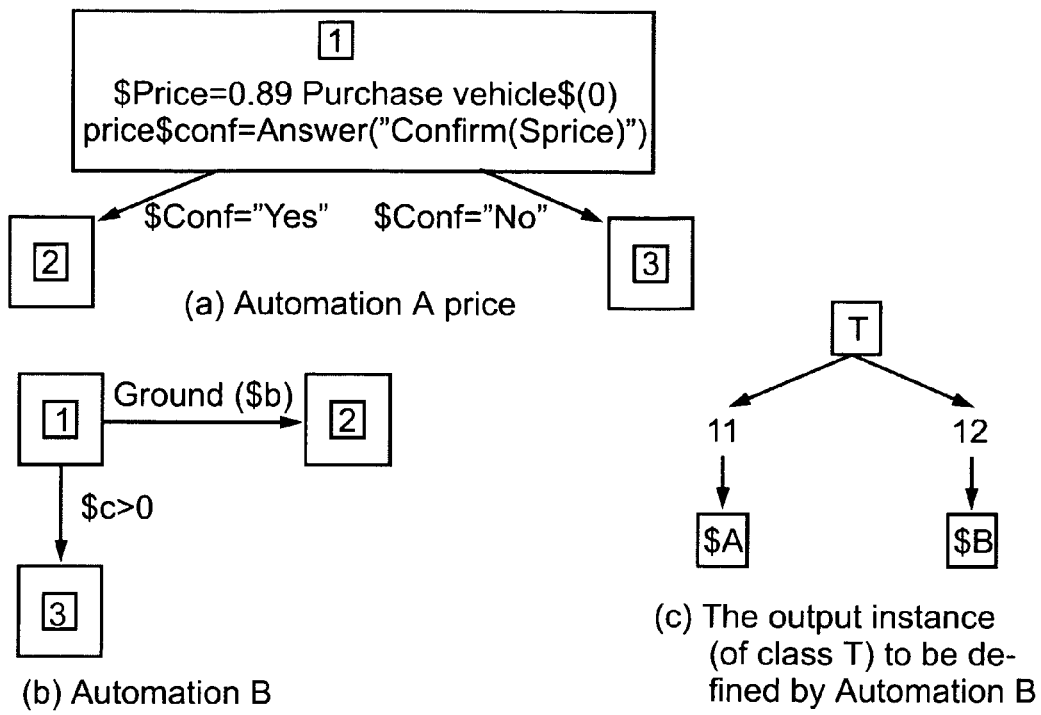
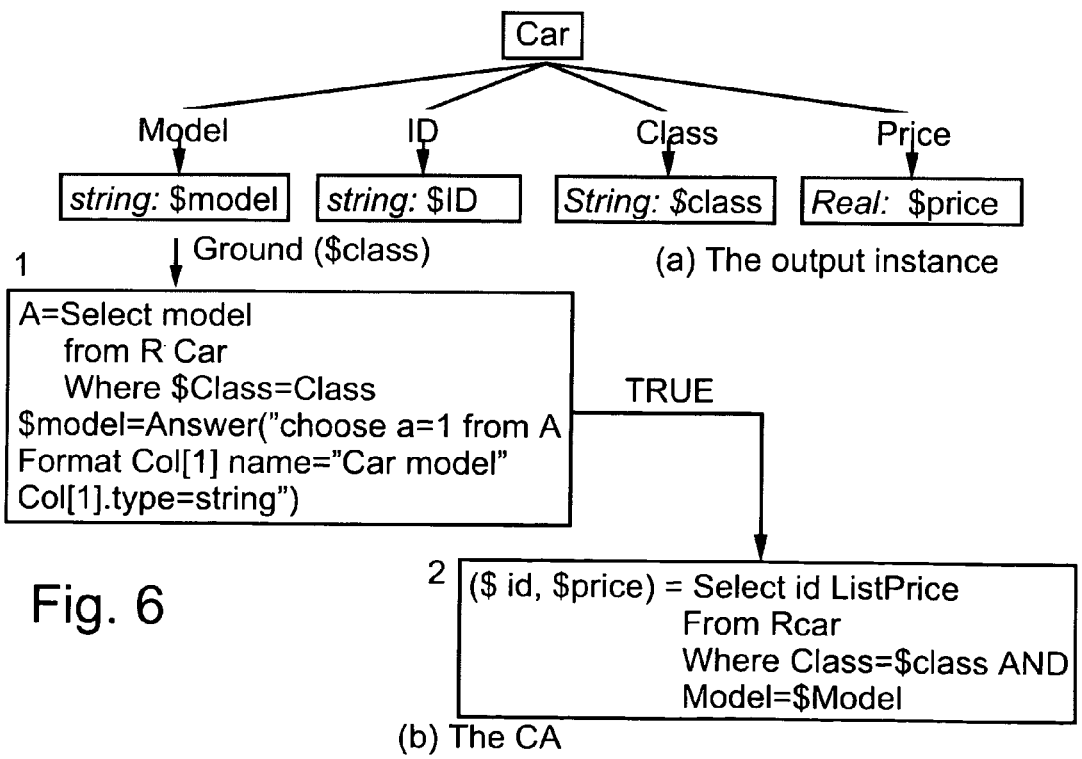

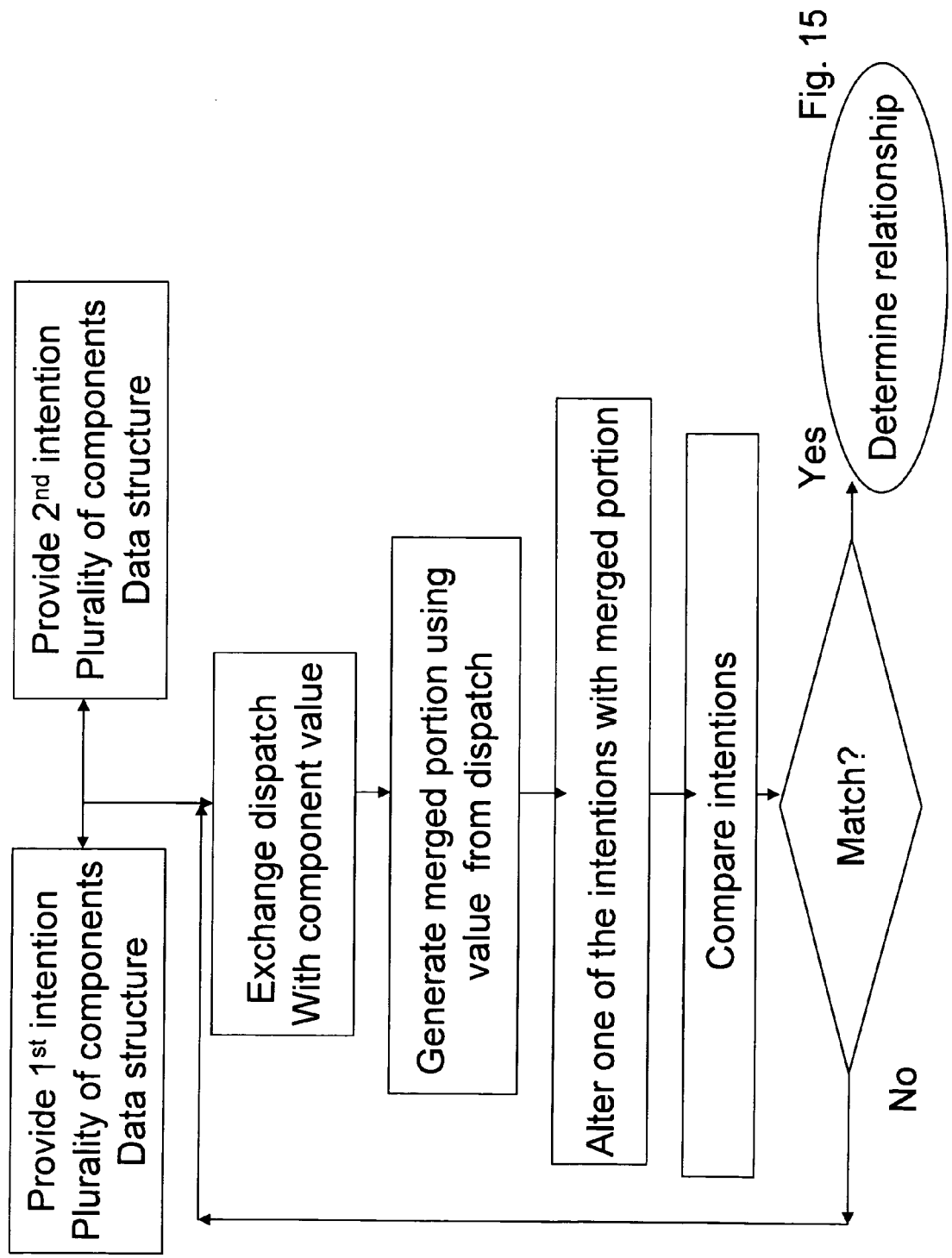

SYSTEM AND METHOD FOR AUTOMATED CONTRACT FORMATION

FIELD AND BACKGROUND OF THE PRESENT INVENTION

The present invention is of a system and method for automated and semi-automated contract formation, and in particular, for automated negotiations which lead to the construction of a contract between two parties.

E-commerce (electronic commerce) is an increasingly popular type of business activity. The term "e-commerce" refers to business activities conducted through the Internet, and in particular through Web sites on the World-Wide Web (WWW). The amount of merchandise sold on the World Wide Web is constantly growing, including products and services which range from the delivery of flowers to the purchase of books and computer hardware. The current architecture for e-commerce on the Web mainly relies upon a Web page-based interface, which is navigated by using the Web browser of the user. Such an architecture has several disadvantages.

First, each vendor must establish a separate, non-standardized, Web site. Therefore, each vendor must rely upon its own technology and non-standardized interface, which is inefficient and time consuming for the vendor. Second, the requirement to navigate through Web sites with a Web browser is inefficient for the user, or potential customer, who may wish to consider only specific products and/or services. Third, there is no standard for conducting automatic negotiations in either business-to-business (B2B) or business-to-consumer (B2C) settings (some sites do offer ad-hoc negotiations, for example "Hagglezone" [http://www.hagglezone.com as of Jan. 2, 2000] and to a limited extent "Priceline" [http://www.priceline.com as of Jan. 2, 2000]. In addition, there are also auctions which offer a form of negotiation as in "eBay" [http://www.ebay.com as of Jan. 2, 2000]). Fourth, there are no facilities and standards for conducting negotiations on package deals, such that most commerce is on single items or a collection of items (also called a basket or a shopping cart) in which each item is considered in isolation (for example http://www.buywiz.com).

One attempted solution to these problems is the provision of automated agents, known as "shopbots", which navigate through a plurality of Web sites in an attempt to locate products and/or services which fit certain parameters specified by the user. For example, such an automated agent may optionally be used to locate a product within a certain price range. Although the automated agent enables the user to consider products from a plurality of Web sites according to one or more specific criteria, the user is still required to navigate through the Web site of the vendor in order to actually purchase the product. Examples of such automated agents include "R U Sure" [http://www.rusure.com as of Jan. 2, 2000], and "BuyWiz" [http://www.buywiz.com as of Jan. 2, 2000] which are agents for buying goods, as well as various types of information brokers, which retrieve information about products and services through the Internet [1]. Such systems are generally task-oriented and do not define a general framework for negotiation. Thus, this attempted solution does not address the previously described disadvantages.

Other examples of attempted solutions for the specific problems of negotiation are described in "Agents as Mediators in Electronic Commerce" [2]. For example "AuctionBot" describes an automated auction server, which permits the seller to select from various predetermined protocols for conducting an auction. However, the protocols cannot be flexibly determined during the auction itself. Similarly, "Kasbah" is a Web-based multiagent classified ad system which offers very limited negotiation features, related to the rate with which a buyer increases a bid to a seller over time. "Tete-a-Tete" is a system which provides more flexibility, in that terms other than price can be negotiated, but the negotiation features which are provided are still very limited.

A more preferred solution would provide automated or semi-automated processes for e-commerce, which are still sufficiently flexible to meet the needs of users. These processes would require that the Web sites of vendors become machine-interactable, or capable of interaction with automated tools (software programs). In addition, these Web sites should become machine-analyzable, or capable of being analyzed by these automated tools. The machine-interactability and analyzability properties of these Web sites would enable the process of e-commerce to become automated or at least semi-automated, thereby becoming more efficient and simpler for the user to operate. Furthermore, the automation or semi-automation of these processes would enable the user to locate vendors of interest more quickly, and with a greater likelihood of successful matching between the needs of the user and the characteristics of the vendor.

One attempt to provide such a solution is described in an article by S. Bottcher [3], which addresses the need for searching for a business partner in a distributed electronic market. This article discloses the use of a static tree in order to match potential customers to vendors of interest. The advantage of the static tree is that it provides greater flexibility than simple string-based matching, such as that performed by many Internet search engines. The disadvantage of the static tree is that it cannot be used for negotiations or for dynamic matching, since the tree itself cannot be adjusted. Since interactions between a potential customer and a vendor are typically a dynamic process, in which the vendor provides a description of available goods and/or services, and the potential customer then considers whether to make a purchase from the vendor, the use of a static tree is ultimately limiting.

A more useful approach would involve the use of dynamic trees which can be adjusted, or even created, "on the fly" during the course of the negotiations. The trees are only partially defined for initiating the process of negotiation. As the process continues, the trees are constructed, thereby enabling the process of negotiations to be conducted flexibly and dynamically. Furthermore, these data structures enable the ultimate resolution of the process of negotiation to be expressed as a contract, since the dynamically constructed trees are then converted into a language-based description. Unfortunately, such a solution is not available.

There is thus a need for, and it would be useful to have, a system and a method for automated or at least semi-automated, dynamic negotiation between a potential customer and a vendor, in which the Web site of the vendor is capable of interacting with software-based automated tools, and in which the process of negotiation involves the construction of a tree "on the fly", which can then be expressed as a natural language-based description for the determination of a contract between the parties.

SUMMARY OF THE INVENTION

The present invention is of a system and method for the automated, or at least semi-automated, process of negotiation between a potential customer and a vendor through software tools, for example at a Web site, although optionally through computational devices connected by any network. The process of negotiation, if successful, results in the construction of a contract between the parties.

According to the present invention, there is provided a method for at least semi-automatically negotiating a relationship between at least a first party and a second party, the steps of the method being performed by a data processor, the method comprising the steps of: (a) providing a first intention for the first party and a second intention for the second party, each of the first intention and the second intention featuring a plurality of components; (b) exchanging at least one dispatch between the first party and the second party, the at least one dispatch including a value for at least one of the plurality of components; (c) altering at least one of the first intention for the first party and the second intention for the second party according to the value in the at least one dispatch; (d) comparing the first intention to the second intention; and (e) if the first intention matches the second intention, determining the relationship according to the first intention and the second intention.

According to another embodiment of the present invention, there is provided a system for at least semi-automatically negotiating a relationship, the system comprising: (a) a plurality of party modules, including at least a first party module and a second party module, each party module featuring an intention for determining the relationship, the intention featuring a plurality of components to be determined fox the relationship, such that a process of negotiation matches the intention of the first party module to the intention of the second party module; and (b) a central server for initially connecting the first party module to the second party module for performing negotiations. Hereinafter, the term "network" refers to a connection between any two or more computational devices which permits the transmission of data.

Hereinafter, the term "computer" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, enhanced cellular telephones, wearable computers of any sort, which can be connected to a network as previously defined and which has an operating system, as well as electronic or biological hardware, systems, servers and the like. Hereinafter, the term "Windows™" includes but is not limited to Windows95™, Windows 3.x™ in which "x" is an integer such as "1", Windows NT™, Windows98™, Windows CE™, Windows2000™, and any upgraded versions of these operating systems by Microsoft Corp. (USA).

Examples of a "computational device" include, but are not limited to, a computer as defined above, or an independently operated software module or agent in any suitable programming language.

Hereinafter, the term "semi-automatic" refers to a process in which a human decision maker participates in the negotiation/decision phases of a commercial activity.

The method of the present invention could be described as a series of steps performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computer according to which the software application is executed. Examples of suitable programming languages include, but are not limited to, C, C++, Visual Basic, Prolog, Lisp, ML and Java.

GLOSSARY

EC Party: A legal entity that may be involved in a deal. In particular, it can designate individuals, corporations, countries, state and local authorities, organizations and associations.

Intention: A specification of a deal. In particular, it can designate the objectives of the deal (e.g., buy, rent), parties and objects involved in the deal, and constraints and preferences involving these entities.

Component: A component is an entity that is a building block for intentions.

Atomic component: A component describing a simple entity such as a bit, a number or a string.

Compound component: A component that is built of other components.

Constraint component: A component describing constraints on other components, e.g., that one atomic component is larger than another.

Basic component: A component whose structure is known to a user community and is agreed upon as representing a real life concept. Basic components are named.

Variable component: A component that is represented by a variable.

Computable variable component: A variable component that is associated with one or more computational devices. Such a device transforms that variable into a component. This component usually includes further elaboration on the deal.

Dispatch: Any information communicated from one party to another party, including, but not limited to, an intention, a component or a portion thereof, or questions about intentions or components.

Fitting: A process of taking one or more intentions and reconciling them into intentions that together satisfy as much as possible the constraints prescribed by the original set of intentions.

Contract: A set of intentions that are agreed upon by the issuing parties. In particular, if that set consisting of one intention it's called a simple contract. If it includes no variable components it is called a ground contract.

Atomic value: a concrete representation of an atomic component.

Atomic type: A set of atomic values.

Class: a prototype of a compound component, for example a class in Java or C++, a compound term in logic programming (Prolog), a list structure in LISP, etc. The specification of a class can involve atomic types, values and classes. A class usually has a name.

Class value: a particular instance of a class prototype.

Basic class: A class that constitutes a basic component.

Variable: An entity with a name, a type (atomic, class, atomic collection, class collection where a collection is, e.g., list, set, subset, superset, one-of, array) and value (either atomic value, class value, undefined (called null), or a collection of values.)

Computable variable: A variable that is specified to be a computable component.

Reference to a value: This term refers to one of the following items—the value itself, a request for the value, or a set of values from which one value is to be selected.

Abstract class: A class that has a name but no class instances. It is used to abstract classes that appear in a class hierarchy (see below).

Sub-class relationship: A statement that a class, say A, is more general than a class, say B. Classes A and B need not have similar prototypes. Classes may be abstract.

Class hierarchy: A collection of sub-class relationships. It is sometimes required that this relationship be transitively non-cyclic, i.e., that a class is not its own subclass.

Ontology: A collection of class hierarchies. It is sometimes required that no class name appears in more than one hierarchy of the ontology.

Item ontology: A particular ontology that usually contains names of basic classes that correspond to objects or concepts, for example car, bank account, John, Pepsi Co.

General ontology: A particular ontology that usually contains names of basic classes that correspond to transactions, for example buy, rent, lease, transport, invest, destroy, build.

Party information: A set of information items an EC party maintains. This set usually contains its identity, a collection of intentions, and other data relevant to its operation. The party information may change dynamically over time. Parts of it may be published for outsiders to access/view and parts of it may be restricted in terms of who and when can access/view them.

Operator class: A class that indicates constraints on values. Examples are OR, AND, NOT and ONE-OF.

Intention trees: An intention built by the following process. One starts with an instance of a general class, i.e., one belonging to the general ontology, and then may extend it via zero or more extension steps.

Extension step: An extension step is performed by: replacing a null atomic variable by an atomic value, or by replacing a null class variable with a new fresh copy of a class prototype, or by replacing a null collection variable by a collection of values, or by introducing an operator class instance and modifying the intention in accordance to rules of introduction of operator classes.

Constraint: A constraint component specifying limitations on value variables may be associated with, on relationships concerning variables and values, and on aggregates of values.

Message: Communication of information between one or more computational devices.

Reply: A message that is sent as a response to another message or messages.

Relation: A form of representing a collection of information items, each item is composed of fields and values for these fields.

Commerce automaton: A computational device that is specified using states, transitions among states, predicates (i.e., conditions) on transitions, actions to be performed in a state, the forms of input, the forms of output. In particular, actions may be the sending or receiving of messages and creation/destruction/access/modification of values of variables including variables associated with relations and other relations (e.g., those associated with party information). A computable variable component is associated with one or more commerce automata, although preferably the variable component is associated with a single commerce automaton.

Negotiation automaton: A computational device used to answer messages that are generated by commerce automata. The exact internal structure of the NA may optionally be unspecified. Optionally the NA may resemble a CA, and alternatively it may be a program implemented via any language on any computer. The implementation may also optionally include manual answers. As explained below, a negotiation automaton is conceptually associated with every atomic component, basic component, and compound component, as well as every vertex in an intention tree.

Unification of intention trees: The fitting of intention trees. The process optionally involves matching of similar components, the assignment of values to variables, the execution and/or analysis of commerce automata, exchange of messages. The result is one or more intention trees that satisfy as much as possible the constraints expressed by the original intention trees. If the electronic contract (EContract) is said to result. The EContract is ground if all variables are assigned non-null values. The EContract variables may be associated with party or parties that are to determine their actual values at the point of execution of deal(s). The EContract is single if it consists of a single intention.

GUI level: A system layer where users specify constraints, preferences and tradeoffs either by using a graphical user interface, or via a textual or other interface.

Mathematical program: Formalism for encoding the user's GUI level specification. In particular, these could be linear programs, non-linear programs, and such programs involving integral constraints, goal programs or multiplexes.

Negotiation procedures: A set of computational devices, derived from the mathematical programs encoding a user's specification, which are used during negotiations to choose, rank, suggest and improve deals.

Deal improvement phase: An optional phase in which a deal is improved via the interaction of parties.

Trading Mechanism: A method for conducting the deal improvement phase. It may be a one-to-one, one-to-many or many-many.

Deal Splitting: A process of forming a deal in which one intention is matched with a number of intentions, thereby "splitting the deal".

BRIEF DESCRIPTION OF THE DRAWINGS

The foregoing and other objects, aspects and advantages will be better understood from the following detailed description of a preferred embodiment of the invention with reference to the drawings, wherein:

FIGS. 1A-1D are examples of classes, presented as trees, according to the present invention;

FIGS. 2A-2D are variable instantiations according to the present invention;

FIGS. 3A and 3B describes adding operator vertices according to the present invention;

FIG. 4 describes a process of using operator vertices according to the present invention;

FIGS. 5A-5C describe exemplary commerce automata according to the present invention;

FIG. 6 describes an exemplary commercial automaton according to the present invention;

FIG. 15 is a flowchart illustrating a yet further method according to an embodiment of the present invention.

DESCRIPTION OF THE PREFERRED EMBODIMENTS

Figure 7:
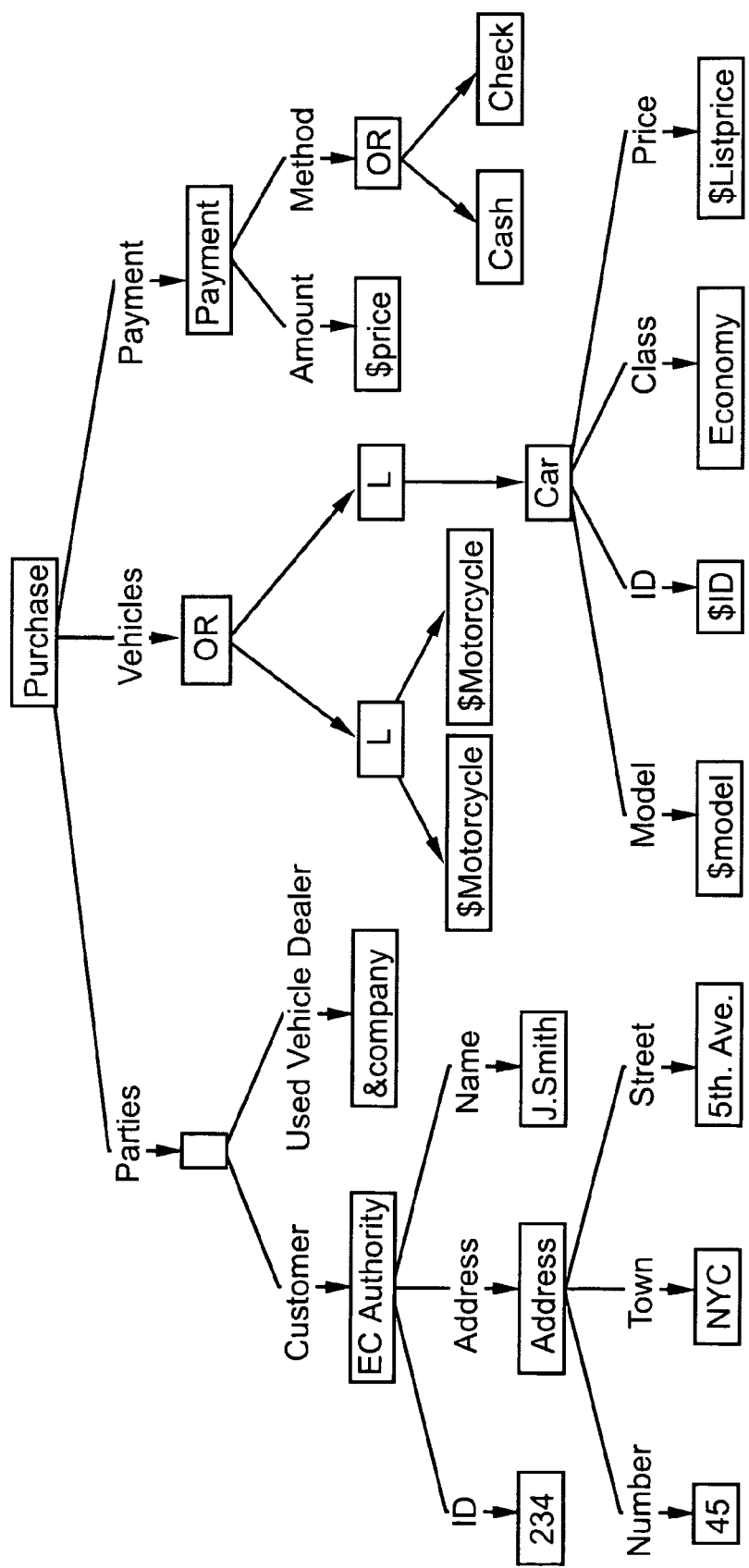
FIG. 7 is an exemplary intention tree of a customer.

The present invention is of a system and method for the automated, or at least semi-automated, process of negotiation between a potential customer and a vendor through software tools, for example at a Web site, although optionally through computational devices connected by any network. The process of negotiation, if successful, results in the construction of a contract between the parties.

The EContracts framework is a preferred implementation of the present invention, which enables e-commerce WWW sites and e-commerce automated tools to present standardized information. This information (1) allows each party to decide whether it wishes to engage in an e-commerce activity with the other party, (2) enables automated negotiation between the parties, and (3) enables the establishment of an electronic contract, i.e., a formal description of an agreed upon e-commerce transaction. The EContracts framework defines the basic software components of an e-commerce party and their interconnections. Based on the EContracts framework, various applications can be built. Examples are deal making applications, deal feasibility checkers, brokers and so forth.

The system and method of the present invention have a number of advantages over the background art. First, entire negotiated agreements, which could be termed a package deal, or contracts can be specified, rather than a single product or "shopping baskets", which are simply collections of products. This advantage is significant, as it enables complex relationships between parties to be negotiated and specified.

Second, this formalism is particularly suited for automatic or semi-automatic negotiations which seek to match, at least partially, the preferences and requirements of each party.

Third, the negotiated agreement or contract can optionally specify a symmetric relationship, rather than simply determining the exchange of money for a product. For example, the relationship could involve the exchange of items. Such a symmetric relationship cannot be determined with the automated agents or other automated tools of the background art, which are designed primarily for the exchange of money for products.

Fourth, the products themselves can be complex, for example involving multiple parameters and options. The products may be particularly complex for business-to-business relationships, in which the products may be a combination of goods and services, for example. As another example of complex products, the product may optionally be an option on two airline tickets in January to a particular city.

Fifth, the present invention enables business rules and data to optionally be exposed only to a desired level. For example, a bank could optionally show interest rates for deposits of up to one million dollars, but not for higher amounts. Also, the level of exposure can be adjusted for negotiation with each party, such that different levels of exposure may optionally be adopted for business-to-business negotiations, as opposed to negotiations with consumers, for example.

Sixth, contracts and/or agreements are specified formally, and hence are more difficult to dispute. The building blocks of contracts can be analyzed in advance by legal authors and experts to verify their compliance with various laws.

Seventh, the formalism presented below is optionally extendible to new market segments, new products and new types of agreements or business relationships.

Eighth, the agreement can easily be expressed in natural language. Certain of these concepts were briefly explored in two papers: D. Konopnicki, L. Leiba, a Shmueli, and Y. Sagiv; "Toward automated electronic commerce"; In First IAC Workshop on Internet-Based Negotiation Technologies; IBM TJ Watson Research Center, Yorktown Heights, N.Y.; March 1999; and D. Konopnicki, L. Leiba, O. Shmueli, and Y. Sagiv; "A Formal Yet Practical Approach To Electronic Commerce"; In Proc. COOPIS '99, Edinburgh, Scotland, September 1999. However, the former paper in particular did not include the detailed, complete realization of the present invention as described herein.

The subsequent description is organized as follows. Section 1 is an introduction to the basic concepts of the present invention, to the goals of operating the present invention, and to the basic architecture of an automatic negotiating tool. Section 2 presents the basic terminology of EContracts. Section 3 defines intentions. In particular, it presents the commerce automata formalism and the way parties exchange messages during negotiations. Section 4 discusses unification, as well as upgraded unification that allows performing unification by relaxing certain constraints. Section 5 presents examples of specific embodiments of the present invention. Section 6 presents a technique for obtaining a user's constraints and preferences and translating them into mathematical programs which can then be used to present results to the user as well as negotiate the user's intentions. In section 7 we describe several basic negotiation mechanisms that are provided for the system's users. Section 8 presents dynamically specified negotiations.

Section 1

Introduction

Structuring Electronic Commerce (EC) is expected to be the main activity on the Internet, private networks and the WWW. A universal formalism ("the HTML of EC") is required, which supports business relationships and negotiations on a global scale, as well as protocols which support automatic tools (agents). The present invention provides such a formalism by enabling parties to specify intentions, a formal outline of deals in which such parties are ready to engage. Intentions are made of components.

Components may be atomic or compound (to any required depth). Furthermore, a component may be a variable component, that is unspecified, or alternatively is specified only according to its type (see below for an explanation of types of components). Components may also be inter-related (e.g., by containment, by edge or labeled-edge connection, or by arbitrary predicates). An important facet of a variable component is its possible association with one or more computational devices, although one-to-one association of a variable component with a computational device is particularly preferred, and is described herein. Such a computational device, based on its perceived state and messages, transforms a variable component into a component. The term "perceived state" is intended to include inputs, values of various components, values of certain other entities such as files, databases and the like. The "new" component is usually "more specific" than the variable component it replaces. According to the present invention, such variable components and their associated computational devices embody transient or policy dependent aspects of the willingness to engage in a deal. It is desirable, although not mandatory, that the functionality of the computational device be readily understood by inspection, a property termed herein analyzability.

Forming an agreement, or negotiating a contract, requires the reconciliation of the constraints placed on deals by the (two or more) parties involved. For simplicity, the present invention is described with regard to two parties, it being understood that the concepts presented herein are easily generalized to multi-party scenarios. Reconciliation involves forming an agreement or contract which, as much as possible, is subject to the directives of the parties, as well as to any general laws which may apply. When examining two intentions, the process of reconciling the constraints may be considered to be a form of "fitting" to these constraints. Abstractly, this process fits the component structure of one party with the corresponding components of the other party.

Each party is assumed to employ a computational entity, or "party machine" (PM), which controls the fitting of intentions. The PM may communicate with other computational devices, and in particular other PMs, in attaining its mission. For example, it may be responsible for activating the "fitting process" or activating the computational device associated with a variable component.

There are some very basic requirements for automated or, at least semi-automated electronic commerce. First, a common terminology for intentions is needed. The analogy here is the natural language used by humans, suitably formalized, for commercial activities, such that the intentions of a party can be readily understood by other parties. Second, a mutually agreeable architecture is needed so that a PM of a party can assume certain abilities of a PM of another party. An analogy here is the client-server architecture of the WWW. Third, as stated, computational devices may issue messages and require responses, which would form a foundation for automated, or semi-automated, negotiations. So, a protocol for negotiations needs to be established for operation with the automated tools, similar to those protocols exercised as part of human behavior in commercial negotiations.

In designing solutions for the above mentioned three requirements, a number of properties are desirable. The common terminology should be simple, yet expressive and powerful. The architecture should be modular and orthogonal, i.e., different modules should address different concerns. To enable a rich set of commerce modes, the structure and content of e-commerce parties should be machine-analyzable. Machine analyzability gives rise to greater efficiency as well (see below). Of course, an e-commerce party should be able to have opaque portions that are not viewable by other parties, and/or with a level of visibility to other parties or classes of parties which is controllable by the owner of the party.

Using these concepts, various applications can be built, as described in greater detail below. Although a particular implementation of these concepts is described herein, it should be noted that other realizations of these concepts are possible. In particular, as described below the present invention is implemented with a programming logic which is similar to that of the Prolog programming language and logic programming. Other implementations may rely on LISP and functional programming, on more natural language oriented formalisms, on Java, C++ and Object Oriented formalisms and many more, such that the description of the preferred embodiments below is not intended to be limiting in any way.

According to the present invention, a number of mechanisms must be implemented for the process of negotiations to be conducted with automated or semi-automated tools. The first step is to ensure that intentions are universally understood. In EContracts, a component is represented as a rooted labeled tree. In fact, an intention is also a rooted labeled tree which is composed of components, together with various constraints and computational devices. The most basic components are simple atomic entities, e.g., of type integer, float, string. Next are basic components that are essentially (usually small) trees whose structure is agreed upon to represent a concept (e.g. car, sale, address). These basic components are called classes and they form the "words" of the common language. The word "class" hints at the fact that in an object oriented realization, these components are likely to be represented as object oriented classes, although the present invention is not limited to such a representation. A component may be a variable component. In this case it appears as a single node labeled with a typed variable. Such a type may be atomic, atomic list, class or list of classes. Such a variable component cannot exist in isolation but must be a leaf of a class.

Using classes, the parties compose their intentions, essentially forming "sentences" which in turn define possible deals. As noted, the purpose of an intention is to describe a deal that a party is willing to engage in. For example, an intention can express that the BooksOnline Corp. is selling books and that if you buy more than five books, you receive a 10% discount. In EContracts, the mechanism that composes words into sentences, or classes into intentions, relies on "variable instantiation" and the introduction of "operator nodes". A (leaf) variable component of an intention is optionally and preferably associated with a computation device, called a "commerce automaton" (CA) in this realization, which prescribes how the variable may be instantiated further during a later phase. A commerce automaton may outline a message exchange sequence between the parties. However, it should be noted that a commerce automaton, and the related entity, the "negotiation automaton" (NA, described in greater detail below), are only one realization of a device or entity for exchanging messages between the parties according to the present invention, and is in no way limiting. In addition to intentions, an e-commerce party also maintains party information, a database or file containing information relevant to the party's activities. This is part of the "system state".

A deal is manifested by creating a mutually agreed upon electronic contract (EContract). The process of obtaining an EContract begins with two initial intentions, presented by the parties. A formal process, called unification, a part of the realization of "fitting", is used to construct an agreed upon EContract, provided such a contract is feasible. Unification may also be used by an e-commerce party to determine whether an EContract is at all possible, prior to entering actual negotiations with the other party, hence the importance and desirability of machine analyzability.

The EContract framework defines the basic software components of an e-commerce party and their interconnections. Each party features a party machine, described in greater detail below with regard to Section 5. The party machine in turn has a number of associated data structures, including a party information data structure and an intentions data structure.

The party information data structure is preferably constructed as a standard relational database which contains the global data of the party machine, such as item lists, pricing information and so forth. This global data is described in greater detail below with regard to Sections 2 and 5. Optionally, at least a portion of the party information data structure may be queried by other party machines, although preferably, a least a portion of party information data structure is opaque, or not accessible, to other party machines. More preferably, the party information data structure includes data which defines the legal status of the party which operates party machine, such as the name, address and telephone number, for example, of the party which operates the party machine.

The intentions data structure preferably defines business goals, expressed as a plurality of intentions. These intentions are described in greater detail below with regard to Sections 3 and 5. Intentions are composed of intention trees (which are derived, by a process of expansion, from classes), commercial automata (which encode business rules), and global constraints. Basically, an intention is a formal description of an e-commerce activity, such as a sale, in which a party operating party machine is willing to engage.

The plurality of components of the party machine include a Negotiation Control Program (NCP), which is an overall coordinator of the activities of party machine. A Constraints Solver is controlled by NCP, but may optionally be queried by other parts of the party machine, and is used to check sets of constraints which are initially specified and/or generated during the unification process, as described in greater detail in Sections 4 and 5 below. Constraint solving is a process which is well known in the art (see for example [4, 5] for a description of constraint-solving techniques).

Briefly, the Constraints Solver returns an answer to the NCP, which may be either Unsatisfiable, such that it is impossible to find an assignment to the variables which appear in the constraints such that the constraints are satisfied, or Satisfiable, such that there exists a satisfying assignment. If the Constraints Solver returns Satisfiable, the Constraints Solver may optionally return a modified, and preferably simplified, constraints set. It may also return a set of answers to constraints equations as well as other indications concerning the provided set (for example, that there are multiple solutions or infinite ones).

An Automata Execution Engine (AEE), controlled by the NCP, is responsible for conducting negotiations and the business rules enforcement. This is done by executing commerce automata (CA), as described in greater detail in Section 3 below. When the execution ends, the AEE controlling the CA returns either SUCCESS, i.e., the CA reached a final state, or FAILURE, i.e., the CA did not reach a final state. If the AEE returns SUCCESS, the NCP in control of the overall process (say NCP1) may optionally modify the EContract with the output of the CA. In this description, the AEE is optionally run by NCP1, preferably in case the CA is associated with a variable in the intention of NCP1's party, or optionally it is run by NCP2 (the NCP of the 'other' party), preferably in case the CA is associated with a variable in the intention of NCP2's party.

A Unifier is again controlled by the NCP and supervises the unification process, as described in greater detail below with regard to Section 4. Briefly, the unification process involves the unification of at least two, but optionally more, intentions submitted by the NCP of a party A and the corresponding NCP of a party B. If it succeeds, the Unifier returns the EContracts. The Unifier may optionally occasionally request the NCP to pass a set of constraints to the constraint solver or to pass a CA to an AEE (again, belonging to either party) for execution.

The principles and operation of a system and method according to the present invention may be better understood with reference to the drawings and the accompanying description, as well as to the examples below, it being understood that these drawings and examples are given for illustrative purposes only and are not meant to be limiting.

Section 2

Basics of the EContracts Framework

The parties involved in an e-commerce activity must agree on a common vocabulary. The "words" of this vocabulary are called classes and, formally, they are rooted labeled ordered trees. The root of a class is labeled with the class name; the edges of the class are labeled with strings which hint at the function of the vertices; the leaves of the classes are labeled with typed variables.

Examples of classes are presented in FIGS. 1A-1D as trees, in which each leaf vertex contains a variable of a particular type (see below for an explanation of the different preferred types of variables). The type in italic script precedes the label for the name of the variable. For example, the Purchase contract class (FIG. 1A) describes a commercial purchase transaction involving a buyer, a seller, a list of purchased vehicles and a payment. The Payment class (FIG. 1B) describes a payment as being composed of an amount of payment and a method for performing the payment. The EC Authority class (FIG. 1C) describes an authority, including identification information, address and name. The Car class (FIG. 1D) describes a vehicle, including model, identification information, class information, and price. Each of these constituents of the classes is described with a typed variable.

The presence of variables in a class enables the class to be customized. There are preferably four types of variables. A first type of variable is an atomic varia. The names of atomic variables begin with a "$" and the values that can be assigned to these variables are values such as string, real and integer. Examples of atomic variables in FIGS. 1A-1D include the identification string $id in FIG. 1C, and the string $amount in FIG. 1B, and so forth.

A second type of variable is a class variable. The names of class variables begin with an ampersand "&" and the values that can be assigned to these variables are class instances. Examples of variables in FIGS. 1A-1D include the payment variable &payment and the EC authority variables &customer and &company in FIG. 1A.

A third type of variable is an atomic list variable. The names of atomic list variables begin with a percentage symbol, "%", and the values that can be assigned to these variables are lists of atomic values.

The fourth type of variable is a class list variable. The names of class list variables are enclosed between parentheses and the values that can be assigned to these variables are lists of class instances. Examples of class list variables in FIGS. 1A-1D include the variable (vehicles) in FIG. 1A.

These notions are captured in the following definitions. The atomic types are defined to be string, integer and real. Other types like date, boolean or enumerated types are possible, but the present description is limited to string, integer and real only for the sake of simplicity and without any intention of being limiting. There is also a set of class names which is a set of strings.

The following definitions are given solely for the purposes of explanation and without any intention of being limiting.

Definition 2.1 A value is either a string, an integer, a real, a class name or one of the special symbols N (for null), L (for lists) or CO for list containment constraints (L and CO are relationship designators, such that the corresponding list elements appear as children).

Definition 2.2 A variable is a triple (t,n,v) where t is an atomic type or a class name, n is a string and v is a value, such that n is the name of the variable. A triple (t,n,v) must satisfy the naming constraints defined above (e.g., atomic variable names must begin with a $ character), together with the obvious type-correctness constraint between t, n and v (i.e., a value must correspond to the type of the variable). A variable (t,n,v) is unbound if v=N. A set of variables V is proper if every variable name in a triple of V is unique, i.e., appears in no other triple as the name entry. The following definitions concern the words of the common vocabulary, namely the classes.

Definition 2.3 A class, over a proper set of unbound variables VAR, is a rooted labeled ordered (RLO) tree, denoted (V,E,r,t,$<_e$, elf, vlf), where V is a set of vertices; E is a set of edges, $E \subseteq V \times V$; r∈V is the root of the tree; t, the label of the root, is a class name; $<_e$ is a partial order relation over E that defines the relative order of the edges that emanate from the same vertex; elf: E→STRINGS is the edge labeling function (defined so that the labels of the edges that emanate from the same vertex are all distinct); and let V'$\subseteq$V be the leaves of T. vlf: V'→VAR is the (total and onto) leaf labeling function. In FIG. 1, each variable (t, n, N) was represented by t: n.

Definition 2.4 Let L be a finite set of class names. A class hierarchy H over L is a directed labeled rooted tree in which every vertex is labeled with a class name in L. No class name may appear twice in the tree.

Classes are organized in class hierarchies, each defining a specialization hierarchy. For example, the Car class of FIG. 1D is a specialization of the Vehicle class. As a consequence, Car class instances can appear in the list of vehicles of a Purchase contract class instance, although such a relationship between classes does not presuppose any structural similarity between them. An ontology is a set of hierarchies containing classes that are semantically related.

Definition 2.5 Let $L_1, \ldots, L_n$ be pairwise disjoint sets of class names. An ontology over $L_1, \ldots, L_n$ is a set of class hierarchies $H_1, \ldots, H_n$ over $L_1, \ldots, L_n$, respectively. An ontology groups classes which are semantically related, and thereby contains the class hierarchy specification for its classes.

A class named a is contained in an ontology O if a is a vertex label in a class hierarchy in O. A class named b is a child of a class named a in O if (1) there exists a class hierarchy T in O such that T contains two vertices u and v which are labeled with a and b, respectively, and (2) there is an edge from u to v. Let the descendant relation be the reflexive and transitive closure of the child relation.

Without being limiting, the existence of three basic ontologies is assumed. The contracts ontology contains the possible e-commerce contracts, such as Purchase, Rent for example. The items ontology contains goods and services such as car, hair-cut for example, which can be the subject of an e-commerce activity. The general ontology contains e-commerce general concepts such as e-commerce authority, payment, interest rate, for example.

For each class name t defined in the basic ontologies, a canonical class representation for t, denoted $C_t$, is assumed to exist, which is a class whose root is labeled with t. An instance of type t is a class that is isomorphic to $C_t$, i.e., identical up to a consistent renaming of variables.

A party is an active component that may be involved in e-commerce activities, for example at an e-commerce WWW site, through commerce activities on the Internet or as a customer buying agent. The EContracts framework assumes a preferably symmetric model, such that the structure of all parties involved in an e-commerce activity is preferably identical, although alternatively differently structured parties may be accommodated in a negotiation. A party manages the party information, i.e., a standard relational database, or optionally a collection of files, that contains the party's global data, e.g., the party's identity, item lists, pricing information and so forth.

Section 3

Intentions

In addition to the party information, in order to advertise its business intentions as well to be machine analyzable, a party should include a formal specification of the way it operates, i.e., the skeleton of contracts it may enter as well as the business rules and the constraints it enforces. The EContracts framework represents this information in intentions. Whereas classes are the words of the common language, intentions are the sentences of this language. Sentences are built by connecting words, such that an intention is composed of an intention tree which is derived from classes, commerce automata which encode business rules, and constraints.

Intention trees describe the structure of EContracts a party is willing to establish. Intention trees are derived from e-commerce contract classes and are transformed into actual contracts by instantiating variables, in order to define the party's requirements, and by adding operator vertices that enable the specification of powerful logical constraints.

Figure 8:
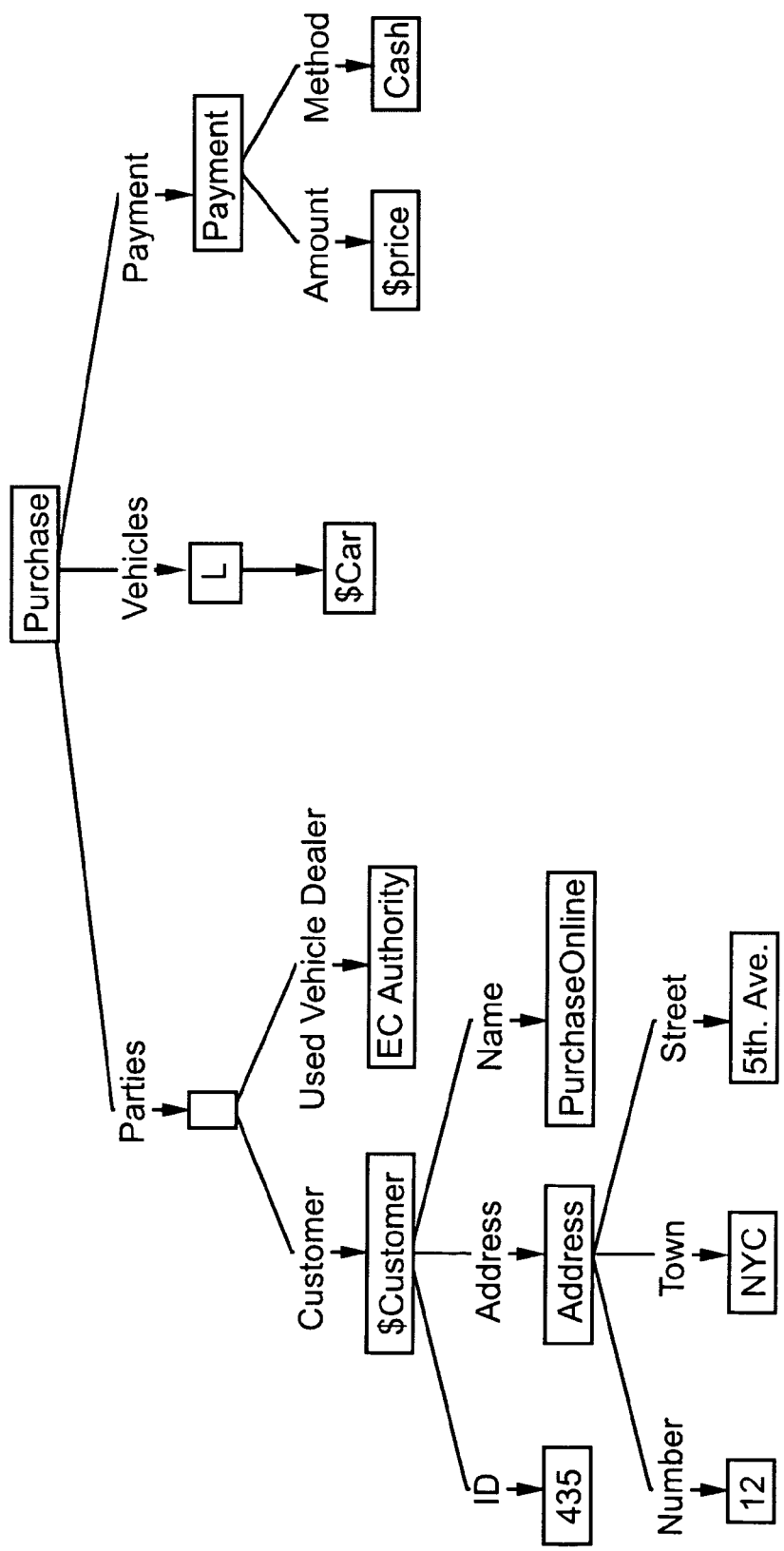
FIG. 8 is an exemplary intention tree of a vendor.

For example, in FIG. 7, the customer, J. Smith, wishes to purchase two motorcycles or, alternatively, an Economy class car. He is ready to pay by either cash or check. In FIG. 8, the PurchaseOnline Corp. is selling cars (one at a time) and is only accepting cash.

Note that the two intention trees in FIGS. 7 and 8 are complementary. The purpose of unification is to detect this fact and to build a unified tree from the intentions, namely the EContract, which is shown in its final form in FIG. 9. These Figures are explained in greater detail below.

Variable instantiation. Formally, variables are instantiated by using the α operator. The α operator takes a tree and a variable-instantiation operation, and produces a tree as follows. Let T be an intention tree and let x=(t, n, N) be an unbound variable appearing in T.

If x is an atomic variable, and v is a value of type t, α (T, x=v) is defined to be T' where T is presented in FIG. 2A. In the figure, "boxed T" symbols represent (sub-)trees and "boxed x" symbols represent vertices. If x is a class variable, let t' be a class name which is a descendant of t in an ontology and let $O'_2$ be an instance of type t'. α (T, x=$O'_2$) is defined to be T' where T' is presented in FIG. 2B.

If x is a class list variable, let (t', ..., $t'_n$) be a sequence of class names which are descendants of t in an ontology and let ($O'_1, \ldots, O'_n$) be instances of types (t', ..., $t'_n$), respectively. α (T, x=($O'_1, \ldots, O'_n$)) is defined to be T', where T' is presented in FIG. 2C. Instantiation of atomic list variables is defined similarly.

Similarly, if x is a class list variable, let (t', ..., $t'_n$) be a sequence of class names which are descendants of t in an ontology and let ($O'_1, \ldots, O'_n$) be instances of types (t', ..., $t'_n$), respectively. Now α (T, x$\supseteq$($O'_1, \ldots, O'_n$)) is defined to be T', where T' is presented in FIG. 2D. The meaning is that the list that can be assigned to x must contain at least ($O'_s, \ldots, O'_n$), that is x must satisfy a list containment constraint. This operation is a partial assignment, as it constrains the possible values of x. List containment constraints on atomic list variables are defined similarly. A list containment constraint of the form x $\subseteq$ ($O'_1, \ldots, O'_n$) can be specified using OR vertices which are defined below.

Operator vertices. Operator vertices are vertices labeled with the strings AND, OR and NOT. Operator vertices are added to an intention tree by using the Δ operator. Let T' be an intention tree, T' is derived by adding to T an operator vertex o as follows.

If o is an OR vertex or an AND vertex, then let u be a vertex in T, let (u,v) be an edge labeled with lab, and let V be the subtree rooted in v. Let $V_1, V_2$ be trees isomorphic to V up to renaming of variables. Δ (T, u, o, $V_1, V_2$)) is defined to be T', where T' is obtained from O by (1) removing V from O, (2) adding an edge (u,o) labeled lab, and (3) adding edges from o to the roots of $V_1$ and $V_2$ (see FIG. 3A).

If o is a NOT vertex, then let V and $V_2$ be the two subtrees rooted at an AND vertex, such that their roots are not already NOT vertices. o can be added to the intention tree as the root of one of $V_1, V_2$, as described in FIG. 3B (for $V_2$).

FIG. 4 presents an example of the use of operator vertices. Recall that CO is a list containment constraint, e.g., variable (x), when instantiated, should contain at least $O_1$ and $O_2$. The meaning is that the list of items (of type t) must contain at least $O_1$ and $O_2$, or $O_4$ and $O_5$, but must not contain $O_3$.

In an intention, the (sub-)trees rooted at vertices that are labeled with the same variable name are required to be identical.

The α and ? operators may be applied to any class instance leading to the construction of a derived instance. For example, the subtree rooted at the Customer edge in FIG. 7 is a derived instance of class EC Authority.

Constraints. An intention contains a set of constraints. A constraint is a function from a value assignment (to a set of variables) to the boolean values TRUE and FALSE. The sub-language used for the expression of constraints is not part of the EContracts framework specification. For the sake of simplicity, in examples, a simple constraints sub-language is used, which is called SIMPLE-C and which is presented through examples. For example, not(Ground($title)) AND ($price>100) AND ($name="John") AND (($name, $price) ∈R) is a constraint. Note that Ground means "is not null" and R denotes a set (relation) of tuples. The assignment C={$title→null, $price→150, $name→"John", R→{("John",150), ("Steve",170)}} satisfies the constraint.

Commerce automata (CA). Negotiations upon variable values (e.g., $price) and business rules enforcement can be expressed by assigning commerce automata to atomic variables, class variables and list variables that appear in intention trees. For the sake of simplicity only and without any intention of being limiting, this description does not consider automata for list variables. They are an extension of the automata for class variables. Furthermore, only business rules and negotiations involving two parties are considered, again for the sake of simplicity only and without any intention of being limiting. However, it is possible to define negotiation protocols involving more than two parties.

Variables. Consider a CA A which is assigned to a variable x of type t in an intention tree. If x is an atomic variable, executing A leads to the assignment of an atomic value of type t to x. In this case, the set of A's output variables is {x}. If x is a class variable, A specifies at least an output instance O which is a derived instance of type t' where t' is a descendant of t in an ontology. Let $x_1, \ldots, x_n$ be the atomic variables that appear in O. Executing A assigns atomic values to some of the variables among $x_1, \ldots, x_n$ and assigns the resulting instance to x. In this case, the set of A's output variables is $\{x_1, \ldots, x_n\}$.

To build the assignment to the output variables, A uses a set of internal variables which can be atomic variables or relation variables, i.e., variables that can be assigned entire relations.

An automaton is provided with an initial assignment to its variables (determined by unification, as shown by the example in Section 4) and the assignment may be modified during its execution. The atomic variables are typed and the relation variables have an associated arity (i.e., the number of columns in the corresponding table). Column names may correspond to variables in the output instance of A.

Parties and messages. The execution of a CA is defined relative to two parties that exchange messages. The roles of the parties during the execution are asymmetric. The active party of this interaction, the one whose automaton initiated the message exchange, sends inquiry messages to the passive party, and the latter replies with answer messages. It is understood that the parties may alternate roles through different interactions, such that a passive party for this interaction may become the active party for the next interaction, and so forth.

The possible inquiry messages and the corresponding answer messages are as follows.

Send t. The active party requests an assignment for the variable t, where t is a variable of any type. The passive party must reply with t=v, in which v is a value of the same as the variable t; or with a choose message which is defined below.

Confirm t=v. The active party requests a confirmation regarding the assignment of value v to t from the passive party. The passive party must reply with Yes to confirm; No, to disallow; confirm t=v', in which v' is a counter offer for the value to be assigned to t; or a choose message, as defined below.

t=Choose C from R format F. The active party proposes to the passive party a set of alternatives from which a choice for the value to be assigned to the variable t should be made. The number of alternatives to be selected depends upon the value of the constraint C. In this message, t is the variable, and the constraint C combines terms of the form m=n, m>n, m<n, m≦n or m≧n, in which m is a natural number, for example 1≦n<3. F is an array describing the names and types of the columns of R. The format of this array is Col[i].Name=Name of column i in R and Col[1].Type=Type of the value in column i in R. The passive party must reply with an agreement to one or more alternative choices which are selected from R conforming with C; or t=Choose C' from R' format F', which constitutes a counter offer.

The names of variables and of columns of relations in messages constitute a vocabulary which must be mutually understood by the parties. These names are understood in the context of the initial unification between the output instance of the activated automaton, say associated with party A, and either (i) a subtree of party B's intention, or (ii) the output instance of a party B automaton. Whichever the case may be, this initial unification establishes an initial vocabulary of variable names and edge labels which may be used in messages to clarify the meaning of later variable and column names.

Similarly, the values which are transmitted in messages, including values which appear inside tables or lists, may optionally be specified to be either hard values which are not negotiable, or soft values, which are negotiable. Soft values may be so indicated by a marker such as a question mark, for example. For example, if the active party sends the message "confirm price=5?", the other party may answer with a counter offer, since "5?" is a soft value. On the other hand, if the message is "confirm price=5", the price is not negotiable and there is no point in sending a counter offer. A similar mechanism may apply when sending values in a table or list from which a selection should be made.

The replies to these messages are optionally determined by the passive party according to a plurality of preferences. These preferences may optionally and preferably include default options, relative preferences, negotiation strategies for particular items, mechanisms for performing parallel negotiations, and software modules for conducting negotiations according to specific principles.

For example, with regard to default options, when asked to make a choice, the passive party could respond by always choosing the first choice or the last choice, or a random choice, or may require the human operator to be queried concerning the choice. Relative preferences can be determined by ranking constraints, for example. Optionally, intention tree nodes can be ranked as guidance for best-effort performance of the unification algorithm (see Section 4 below).

A negotiation strategy for particular items may involve determining acceptable prices or delivery dates, for example. The strategy optionally includes a "bottom line" offer and modes of reacting to counter offers, preferably including a "rate of convergence" to the bottom line offer. Such strategies may also optionally include mechanisms for performing parallel negotiations, for example in order to determine how negotiations with one party should affect negotiations with other parties.

Figure 11:
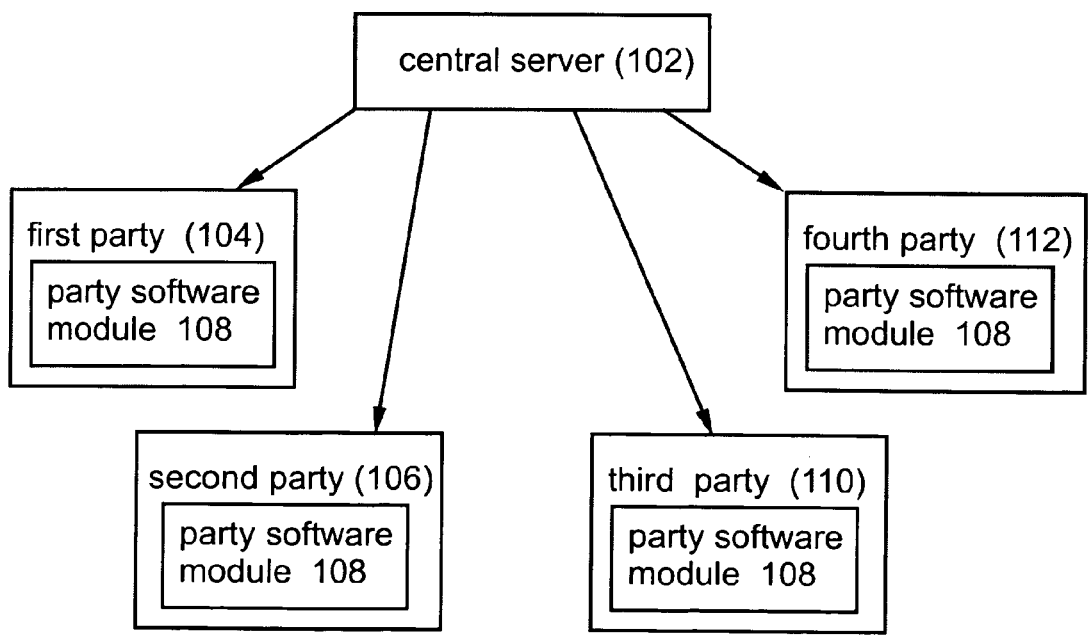
FIG. 11 is a schematic block diagram of an exemplary party architecture according to the present invention.

Optionally, software modules which are dedicated to conducting negotiations based on set principles may also be included within the party architecture of FIG. 11, as described with regard to Section 5, in order to determine the answers to the messages of the active party. Examples of such set principles include, but are not limited to, AI (artificial intelligence), neural networks, psychological principles, economics or any other set of principles.

Optionally and more preferably, the preferences of each party are specified textually and/or through a GUI (graphical user interface). Optionally and also more preferably, these preferences are specified at several levels. For example, these preferences may concern specific features in a deal. Typical examples are lowest price or earliest delivery date. As another example, these preferences may concern a particular set of features in a deal. For example, a preference may link the price with the quality of the products, as in accept lower quality in conjunction with a better price. As yet another example, preferences may be specified for the deal as a whole, such as a preference for deals with no extra options, or, an insistence for deals in which all the dates must be fully specified. More specific preferences preferably are emphasized over less specific, more general preferences.

These user preferences are then preferably compiled, or translated into, automata, optionally and preferably with other business rules. Such a process of translation may optionally be automatic or manual. The previously described GUI may optionally also be used to embed business rules by presenting various options to a user, such as a buyer, seller or participant in a symmetric negotiation. Based on the selected options, either manually or alternatively through a compiler, the preferences of the user are translated into automata which are associated with variables in an intention.

Negotiation Automata (NA). Furthermore, the compiled user preferences may optionally and preferably be used in a preferred embodiment of the present invention, which uses negotiation automata (NA). An NA is a computational device associated with every intention tree node, and not only leaf nodes such as in the case for commerce automata (CA). The NA which is associated with a node v answers messages regarding values and variables occurring in its sub-tree. Every intention tree node is conceptually associated with an NA. When such an NA is not able to answer a message, that NA passes the message to the NA associated with its parent node. The uppermost NA, associated with the root node, answers with default values if necessary, which may optionally be those values determined according to compiled user preferences for example. This case is similar to the one in which the NCP answers all the messages. The exact internal structure of the NA may optionally be unspecified. Optionally the NA may resemble a CA, and alternatively it may be a program implemented via any language on any computer. The implementation may also optionally include manual answers.

The NA's are useful for a number of purposes. For example, a buyer may indicate an interest in products which have delayed expiration dates, and in addition, for each expiration date interval, specify a maximum acceptable price. In the intention of the buyer, the list of products to buy is represented by a variable such as a. The preferences of the buyer are preferably compiled into an NA associated with a, the purpose of which is to answer propositions and to negotiate with regard to expiration dates and prices.

Optionally, a party may use one of its own CA's in order to generate some part of its intention tree and then, one of its own NA's in order to check whether the generated part complies with its preferences.

The relational store. During its execution, a CA can query the relations in its relational store which contains (1) the relations in the active party's party information and (2) relations for relation variables. Furthermore, a CA can access the labels of vertices of intention trees. For example, the value of the Number leaf in the intention tree in FIG. 7 is given by Purchase.Parties.Customer.Address.Number.

Also optionally and more preferably, accesses to databases are specified according to some version of SQL (Structured Query Language), which is a standard database language.

States. A CA has a set of states S. One state is distinguished as the starting state and there exists a non-empty subset $S_f \subseteq S$ of final states. Each state is labeled with an assignment program, i.e., a sequence of assignment statements. Given an assignment to the automaton variables, say $\sigma$, the execution of an assignment program P modifies a by executing the assignment statements, one after the other. The assignment statements and their semantics are presented in the example of Table 1.

TABLE 1

An assignment program

| Instruction | Current Assignment |
|---|---|
| Initially | $\$a \to 2, \$b \to 3, R(C, D) \to \{(1, 3), (2, 4)\}$ |
| $\$b = 5$ | $\$a \to 2, \$b \to 5, R(C, D) \to \{(1, 3), 2, 4)\}$ |
| SELECT * AS :$a, :$b FROM R; | The values of the columns of the first tuple returned by the query are assigned to $a and $b. $\$a \to 1, \$b \to 3, R(C, D) \to \{(1, 3), (2, 4)\}$ |
| Send $a | The active party sends the message "Send $a". The value returned by the passive party, say 8, is assigned to $a. $\$a \to 8, \$b \to 3, R(C, D) \to \{(1, 3), (2, 4)\}$ |
| Q = Choose n = 1 from R Format Col[1].Name = C, Col[1].Type = Number, Col[2].Name = D, Col[2].type = Number | The active party sends the message "Choose . . . ". The one tuple relation returned by the passive party is assigned to Q. $\$a \to 8, \$b \to 3, R(C, D) \to \{(1, 3), (2, 4)\}, Q(C, D) \to \{(2, 4)\}$ |

The CA transition function, say $\delta$, is applied to a state and a constraint and yields a state. For example, $\delta(s_1, \text{ground}(\$x)) = s_2$, means that if the CA is in state $s_1$ and the variable $x is ground (in the state of the current assignment) then the CA should move to state $s_2$.

Definition 3.1 (Commerce Automaton) A commerce automaton, say A, is a tuple $A = (S, b, S_f, O, V, P, f_P, \delta)$ in which the following definitions apply. S is a set of states. b$\in$S is the starting state. $S_f \subseteq S$ is the set of final states. O is the output specification. V is the set of the automaton variables. P is a set of assignment programs and $f_p$ is a function that maps states in S to programs in P. δ is the (partial) transition function δ: S×SC→S, where SC is the set of all SIMPLE-C constraints. O may be an instance of a class t or optionally obtained from such an instance using a sequence of variable instantiations.

As part of a CA execution, messages are sent and answers are received. In this formalization, the sequence of received messages is modeled as a stack of messages. In reality, answers are generated by the passive party based on its perceived state and negotiation strategy. Given an initial assignment δ and a stack of answer messages Γ, the execution of the automaton is defined as follows. The execution begins at the starting state with the initial assignment. When the automaton enters a state s, it modifies δ by executing the program $f_p(s)$. If $f_p(s)$ involves message exchanges, the answer to each inquiry message is popped from Γ. If Γ is empty or the answer message in Γ does not correspond to the inquiry message, then the execution stops. The constraints on the transitions from s are checked. If none is TRUE, or more than one is TRUE, then the execution stops. If exactly one is true, the automaton moves to the new state. If no transition exits from s, the execution stops in s. If the execution stops in a final state, then the execution is successful, and otherwise it fails.

Consider the CA APrice in FIG. 5A which is assigned to the atomic variable $price in the used car dealer's intention (FIG. 8). The company uses this automaton in order to assign a value to $price. The starting state is 1. First, the price of the purchased vehicle is assigned to $price (with a discount applied) and, using the Confirm construct, the company asks the customer for price confirmation. The customer's answer is assigned to the variable $conf. If it is Yes, the automaton's execution is successful (state 2), otherwise it fails. It fails in state 1 (if the answer is neither Yes nor No) or in state 3 (if the answer is No).

With regard to the CA in FIG. 5B, the convention is that an order condition involving a variable which is not ground evaluates to FALSE. This automaton is assigned to a class variable, say x, and, therefore, it defines an output instance (shown in FIG. 5C) that should be assigned to x, in case the execution of the automaton succeeds. The automaton is provided with an initial assignment of its variables. If the initial assignment is {$b→1}, the automaton enters state 2 and stops. Since 2 is not a final state, the execution fails. If the initial assignment is {$b→1, $c→1} the two constraints are satisfied, therefore the automaton cannot move to the next state, and, therefore, stops (and fails) in state 1. If the initial assignment is {$c→1} the automaton enters state 3 and the execution is successful; 2 and 5 are assigned to $a and $b, respectively, in the output instance.

An intention and a party data structure can now be formally defined as follows. An intention is a tuple (T,F,S,C) where T is an intention tree, S is a set of CA's, F is a partial function from the atomic variables and the class variables that appear in T to S, and C is a set of constraints. A party data structure is a tuple (SI,I) where SI is the party information and I is a set of intentions indicating the EContracts the party is ready to enter.

Less formally, intention trees describe the structure of Econtracts (electronic commerce contracts) that a party is willing to establish. Therefore, intention trees are derived from e-commerce contract classes. These contract classes are transformed into specialized contracts through the use of instantiating variables and introducing operators as previously described. If the intention trees of two parties are complementary, then the unification process detects such complementarity in order to build a unified tree from these intentions, which forms an EContract. Parts of this construction involve the instantiation of variables via automata, a process that optionally involves the exchange of messages between the parties and which therefore optionally includes a process of negotiating.

Section 4

Unifying Two Intentions

As previously described, the unification of the intention trees of two parties leads to the establishment of an EContract. Such unification is preferably performed through a process which is essentially a process of negotiation, and which can be either automated or semi-automated, as previously described. This Section provides a formal description of the process of unification, along with examples of preferred unification algorithms.

Basic unification. The unification algorithm is an extension of the unification algorithm for terms in logic and in logic programming. The algorithm is extended to handle operator vertices and CA's and is presented through the following example (the algorithm is formally described in the Appendix). The customer (whose intention tree is shown in FIG. 7) has one constraint, i.e., that the cost is less than $300 ($price<300). The used car dealer (whose intention tree is shown in FIG. 8) has two CA's. The Acar CA, which is associated with the variable &Car in the intention tree, describes how cars are sold (FIG. 6 contains a part of the automaton definition). The second CA, APrice (shown in FIG. 5A), is associated with the variable $price. PurchaseOnline's site information includes the relation Rcar(Model, ID, Class, ListPrice).

The unification starts at the roots of the two intention trees. In the Parties subtree, the Customer and UsedVehicleDealer edges are unified. Corresponding subtrees are assigned to the variables &customer and &company, respectively. At the Vehicles subtree, the algorithm reaches an OR vertex in the customer's intention tree. In turn, each subtree under the OR vertex is unified with the Vehicle subtree in the company's intention tree. The unification of the left branch obviously fails, since, it is impossible to unify a list of two motorcycles with a list that contains one car. At the right branch under the OR vertex of the customer's intention tree, the vertex labeled Car is unified with the vertex labeled &Car in the company's intention tree. Since the varia&Car is assigned to the Acar CA (shown in FIG. 6B), the customer's subtree rooted in Car is unified with the output instance of the Acar CA (shown in FIG. 6A). This unification provides the initial assignment for the CA variables, i.e., Economy is assigned to $class.

The Acar CA is executed as follows. Since the variable $class is ground, the automaton moves to state 1. The automaton assigns to the relation variable A all the cars that correspond to the customer's class specification (Economy). Then, the automaton asks the customer (party) to choose a model. This choice may be done in several ways; human intervention may be requested, or an automatic tool, for example, an NA as defined above may be used. Such an automatic "expert" tool may, simply, choose an arbitrary car or employ more complex user-defined strategies. It can also try every choice, one after the other, and use backtracking if some choice leads to the failure of the automaton (The term "backtracking" indicates repeated trials by returning to earlier choices and considering alternatives to these previous choices, and is a technique which is known in the art. For example, this technique is employed in the Prolog language and interpreter as well in certain AI (artificial intelligence) systems.).

After receiving the model name, say "Cavalier", the automaton selects the car, say (Cavalier, 322, Economy, 230), from the database (state 2). When the automaton reaches its final state (state 2) the assignments are $model←E-"Cavalier", $id←322, $class E-Economy, $pric1←230. These assignments are applied to the output instance of the automaton. The (modified) output instance replaces the node labeled &Car in the intention tree of the used car dealer (FIG. 8) and the subtree rooted at the "boxed" Car node in the customer's intention tree (FIG. 7).

Following this assignment, the current constraint set ({$ListPrice=230, $price<300}) is verified as satisfiable and the unification algorithm resumes. Optionally, the automaton state is kept in order to be able to backtrack to this state later in the process of negotiations, in case of a failure of a later state, for example if backtracking is required in order to perform unification by returning to a previous state.

Figure 9:
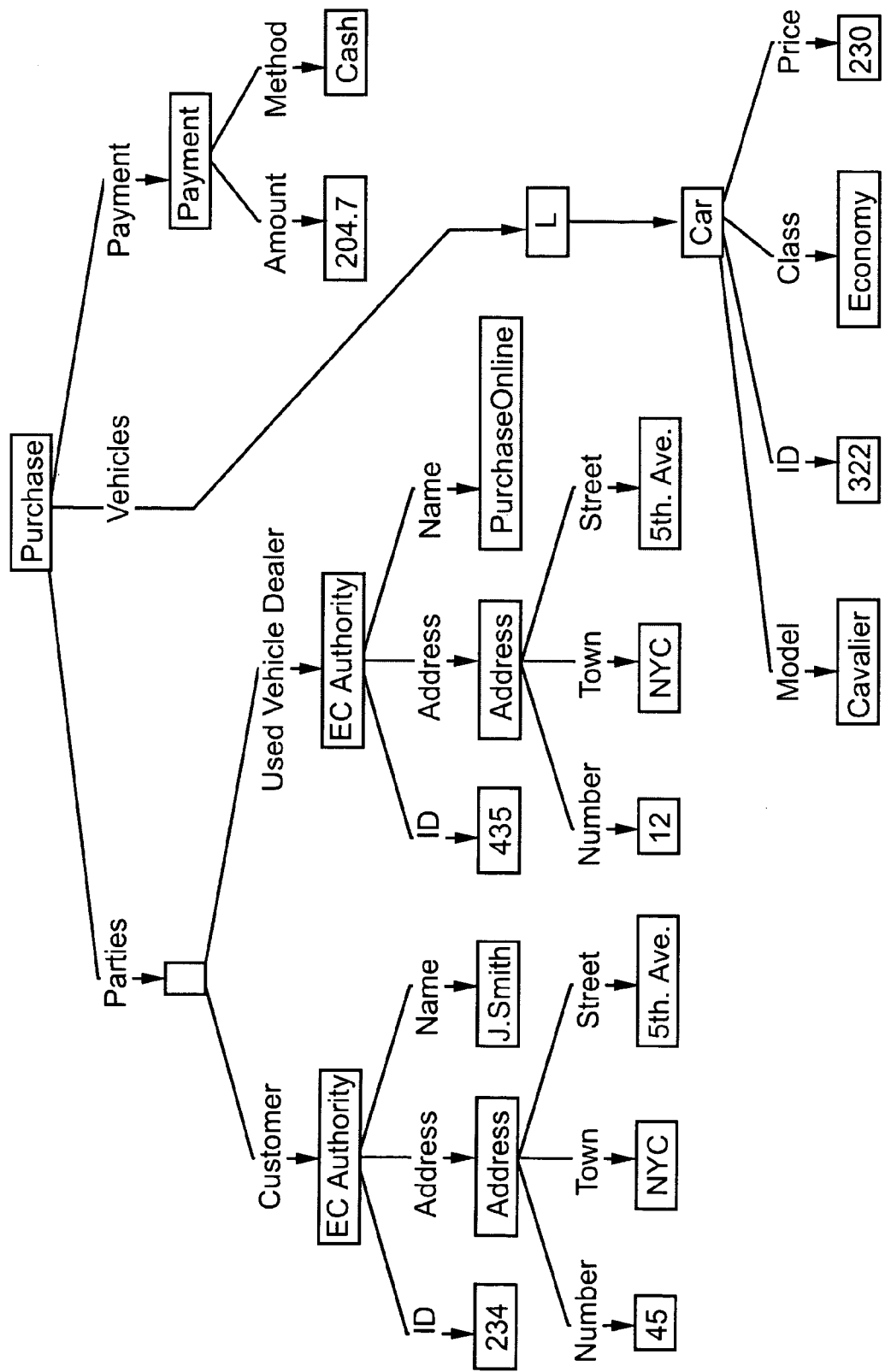
FIG. 9 is an exemplary unified intention tree as an EContract.

The unification proceeds to the Amount edge and the APrice CA (shown in FIG. 5A) is executed. After confirmation, the new set of constraints {$ListPrice=230, $price=204.7, $price<300} is checked by the constraint solver and the unification proceeds to treat the Payment subtree. The generated EContract is depicted in FIG. 9.

With regard to backtracking, each CA or NA is preferably implemented as a stand-alone independent process with the following characteristics, explained with regard to the Prolog language, although it is understood that such a process could be implemented in other programming languages such as C++ or Java, for example. First, the three intention trees, from the first and second parties, and the partially unified tree, are preferably passed between the parties as the process of unification proceeds. This convention enables backtracking to be more easily performed, by providing access to the values of the trees at each stage.

Second, a message is preferably sent by the Send predicate and a message is preferably received by a Receive predicate, which are implemented as Prolog commands.

Third, the Prolog language provides for automatic backtracking for a Send or Receive command, without any side effects, to the predicate or rule immediately proceeding the execution of the command. An automaton statement which sends a message and assigns the result to a variable is implemented through a Send predicate followed by a Receive predicate.

Fourth, a message can be sent from a CA to the appropriate NA. The appropriate NA can be determined from the original unification performed when the automaton execution was requested. Observe also that a CA can optionally invoke the services of an NA of its very own party, say for consultations.

Fifth, when an NA cannot answer a message, it passes the control to the closest ancestor automaton in the intention tree, by calling the Prolog program implementing the automaton. A CA or an NA can optionally navigate through the intention trees and refer to each node according to the fixed or relative path from the current position. This enables the CA or the NA to refer to values of various variables within its code.

For an implementation with SQL as the access language to the data in relations, the backtracking of SQL commands within a CA or an NA is preferably performed as follows. An assignment out of a "select" command simply moves to the next tuple, which is similar to the traditional SQL cursor mechanism. When no further tuples are available, the "next" tuple is assigned a null value, such that retrieving this tuple results in a failure. An insert or delete statement is backtracked by moving to a savepoint immediately prior to the insertion or deletion, respectively.

A Best Effort Unification Algorithm. This algorithm is an illustrative example of a preferred algorithm for use in situations where the unification algorithm fails. This preferred algorithm is an approximate unification algorithm. The basic underlying idea is that of upgrading parts of intention trees. As an example, suppose that an intention tree specifies the constant red in a node. Suppose further that this is in fact a preference rather than an ultimate requirement. One option is to use OR nodes and give additional color options (observe, that by the way the Prolog interpreter operates, priorities of colors are naturally assigned in left to right order). But, the specification of many colors is tedious, such that in addition, preferably the party may even allow any color as a last resort. The proposed solution is to prioritize at least some of the nodes and edges of the intention tree. A priority is a natural number, such that the higher the number, the more important is the constraint represented by the node. Similarly, constraints in the set of constraints associated with the intention may also optionally be prioritized.

If priorities are assigned to edges connected to the alternatives of an OR node, AND node, or to list elements, then the highest priority alternatives within such OR, AND or list node are tried first. The others may be considered to be temporarily eliminated. So, these priorities indicate an order for the unification algorithm. (This is not coded in the algorithm presented in the Appendix.)

Priorities in nodes and edges can be used as follows. Suppose unification fails, then a low priority node can be replaced with a less constraining node. This replacement is optionally performed by "upgrading" the node. A node upgrade can be any sequence of actions (as defined below) applied to nodes in the intention which result in an acceptable tree. Some actions apply to edges and make them less constraining. An action is defined as one of the following.

First, consider a node labeled with a variable of class c, the variable is modified to be of class c' which is a superclass of class c. The modification applies to all occurrences of the variable.

Second, consider a node labeled with a variable X. The node is relabeled with a variable Y. If variable Y appears elsewhere in the intention, the node must be labeled with the same class as in other occurrences. Variable Y may also chosen as a completely new variable.

Third, consider a node which is the root of a subtree and labeled by a (bound) variable. Make the variable unbound by erasing the subtree, except for the node that is now labeled with the unbound variable. The modification applies to all occurrences of the variable.

Fourth, consider a list node connected via edges to the list elements. Eliminate a list element.

Fifth, consider a node labeled with a variable X which is associated with an automaton. Disassociate the variable from the automaton.

Sixth, consider an edge e with label lab. Change lab to another label that appears in one of the intentions or eliminate the label altogether.

Seventh, consider a node in the tree, connected via an edge e to its parent, which is the root of a subtree T. Eliminate edge e and the subtree T altogether. This is a drastic measure that may be needed if, for example, multiple versions of classes exist due to outdated or erroneous software. It is also possible that portions of trees are stored in various media or locations that may be inaccessible, temporarily or permanently.

So, upgrading provides further options to the unification algorithm to explore. It may result in solutions that only approximate true unification of the pre-upgraded intentions, thereby "unifying as much as possible".

There are some technical issues to consider. One such issue is that the upgrading of the least important node may not suffice to produce a unified intention. Further upgrades may be required, but then the question arises of the order in which to perform them. Suppose that 4 nodes A,B,C and D are labeled with decreasing priorities, say 4,3,2 and 1, respectively. An order that seems most reasonable is as follows (other orders are also possible): first, upgrade D; if the above action fails upgrade C; if the above action fails, upgrade C and D; if the above action fails, upgrade B; if the above action fails, upgrade B and D; if the above action fails, upgrade B and D and C; if the above action fails, upgrade A; if the above action fails, upgrade A and D; if the above action fails, upgrade A and D and C; and if the above action fails, upgrade A and D and C and B.

It should be noted that an aggregate condition may optionally be demanded in defining the best approximation, e.g., as a function of priorities as well as the number of upgrades. Also observe that if a prioritized node u is the parent of another node v, once u is labeled with an unbound variable there is no need to try upgrades to node v, the node is no longer in the tree.

Another issue is determining the order for applying upgrades if two intentions are given. A reasonable but optional mechanism is to alternate between the two intentions, for example by mapping the priorities of the first intention to odd numbers and those of the second intention to even numbers, and then applying the upgrades to the intentions in priority order as described above. Other prioritizing schemes are also possible and are considered to fall within the scope of the present invention.

Constraints may optionally and preferably be relaxed in a similar way, optionally with more degrees of relaxation. For example, a<b may be relaxed to a≦b. Relaxation may also optionally eliminate a constraint altogether. Here again, the priority of the constraint indicates its importance and order of relaxation or elimination.

Section 5

Examples of Preferred Implementations

The previous Sections considered a formal description of one implementation of the system and method of the present invention. This Section describes preferred embodiments of the present invention, which are specific examples of different applications of the present invention. These examples are intended only to illustrate the present invention, and should not be construed as being limiting in any way.

Figure 10:
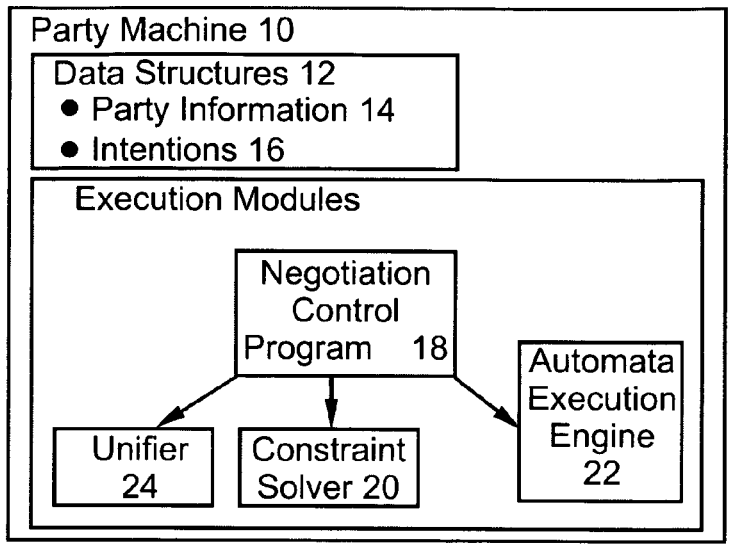
FIG. 10 is a schematic block diagram of an implementation of the present invention.

As shown in FIG. 10, a system 100 has a central server 102, a first party 104 and a second party 106. Each of first party 104 and second party 106 operates a party software module 108, which is optionally the software of FIG. 12, as described in greater detail below. Central server 102 is used to locate relevant parties for intentions, for example through registration, searching, or a combination thereof. Once first party 104 and second party 106 have been located, the respective party software modules 108 conduct the negotiations.

For example, suppose first party 104 is a buyer who wishes to purchase 4 of product A and 4 of product B. Central server 102 identifies second party 106 who supplies product A, third party 110 who supplies product B and fourth party 112 who supplies both product A and product B. Negotiation is preferably performed in parallel between first party 104 and each of second party 106, third party 110 and fourth party 112. First party 104 may therefore optionally be required to present portions of its intention as separate intentions to each of second party 106, third party 110 and fourth party 112. The optional separation of intentions is performed by party software module 108. First party 104 may then optionally choose to purchase one of product A from second party 106, one of product B from third party 110 and three each of products A and B from fourth party 112. For this embodiment, central server 102 is optionally replaced by any Internet search engine, such as "Google" for example [http://www.google.com as of Jan. 2, 2000].

In a second illustrative embodiment, each buyer is equipped with basic software for determining intentions, automata and preferences for negotiation. Each seller is equipped with similar software, as well as with connections to corporate data. Buyers and sellers, who may be one of the parties 104, 106, 110 or 112 of FIG. 11 for example, register with central server 102. However, now party software modules 108 of each party are preferably restricted in function, such that central server 102 performs the process of negotiation, as a trustee of the parties. Therefore, party software modules 108 could even optionally be implemented through a Web browser, for example, optionally with applets or Java scripts, or other scripts, or even with a specially built "thin" Web browser which is dedicated for this purpose.

Central server 102 may optionally store intentions, or alternatively may use intentions stored at each party. Central server 102 may also optionally offer additional services such as financial services, advertisements, supplier ratings, customer ratings, and product and service reviews.

In an optional variation of this embodiment, central server 102 executes negotiations on behalf of at least one but not all parties, while at least one party executes its own software at its own site. In this variation, also optionally, a client or party may participate without a computer and software, by submitting intentions manually to central server 102, for example.

In a third illustrative embodiment, central server 102 itself may be a party to commercial arrangements. For example, central server 102 may optionally purchase three of product A from second party 106, one of product B from third party 110 and three each of products A and B from fourth party 112. At end of the negotiating process, central server 102 remains holding two units of product A, which central server 102 can then sell to another party. This provides the possibility of brokering a plurality of commercial arrangements in "back to back" deals, packaging by combining the intentions of various buyers to obtain a larger volume, and so forth. Thus, in this embodiment, central server 102 is a broker.

Any of these embodiments may optionally be operated by vendors who are oriented to a particular market segment, such as travel or consumer electronics for example, by a company and its suppliers and/or customers, by a group of companies or organizations, within a particular company, or by individuals wishing to construct a marketplace.

Referring now to the drawings, FIG. 10 is a schematic block diagram of an e-commerce party according to the present invention. The EContract framework defines the basic software components of an e-commerce party and their interconnections. As shown, a party machine 10 features a plurality of parts, with associated data structures 12, including a party information data structure 14 and an intentions data structure 16. This complete embodiment of party machine 10 should be installed at each party of FIG. 11 for the first embodiment, in which the parties negotiate between themselves, such that party machine 10 acts as a device for negotiations within the context of the system of FIG. 10. Alternatively, for the second embodiment, in which the server acts as a trustee for the negotiations, each party need only have intentions data structures 12.

Party information data structure 14 is preferably constructed as a standard relational database, or optionally as a collection of files, containing the global data of party machine 10, such as item lists, pricing information and so forth. This global data is described in greater detail above with regard to Section 2. Optionally, at least a portion of party information data structure 14 may be queried by other party machines 10, although preferably, a least a portion of party information data structure 14 is opaque, or not accessible, to other party machines 10. More preferably, party information data structure 14 includes data which defines the legal status of the party which operates party machine 10, such as the name, address and telephone number, for example, of the party which operates party machine 10.

Intentions data structure 16 preferably defines the formal structure of the commerce intentions of party machine 10, expressed as a plurality of intentions. These intentions are described in greater detail above with regard to Section 3. Intentions are composed of intention trees (which are derived, by a process of expansion, from classes), commercial automata (which encode business rules and global constraints). Basically, an intention is a formal description of an e-commerce activity, such as a sale, in which a party operating party machine 10 is willing to engage. Intentions data structure 16 is optionally and preferably implemented with XML (Extensible Markup Language).

Preferably, intentions data structure 16 is in the form of a tree, with a plurality of components. Optionally, intentions data structure 16 is also stored at the server of FIG. 11, more preferably storing a separate intentions data structure 16 for each party, or client, of FIG. 10.

The plurality of parts of party machine 10 include a Negotiation Control Program (NCP) 18, which is an overall coordinator of the activities of party machine 10. NCP 18 is preferably operated by the server for the second embodiment of FIG. 10, in which the server acts as a trustee. More preferably, the server also operates all of the parts of party machine 10 which are controlled by NCP 18 for this embodiment. Also in this embodiment, NCP 18 is implemented as an instance (i.e., a "copy") of an NCP for the particular process of negotiations being handled by the server. The NCP also encompasses and controls the negotiation automata (NA's) which are associated with intention trees nodes.

A Constraints Solver 20 is used by NCP 18, or alternatively may be used by an AEE 22, or even preferably by any automaton. Constraints Solver 20 is used to check sets of constraints which are initially specified and/or generated during the unification process, as described in greater detail in Section 4 above. Briefly, Constraints Solver 20 returns an answer to NCP 18, which may be either Unsatisfiable, such that it is impossible to find an assignment to the variables which appear in the constraints such that the constraints are satisfied, or Satisfiable, such that there exists a satisfying assignment. If Constraints Solver 20 returns Satisfiable, Constraints Solver 20 may optionally return a modified, and preferably simplified, constraints set.

An Automata Execution Engine (AEE) 22, controlled by NCP 18, is responsible for the negotiations and the business rules enforcement. This is done by executing commerce automata (CA), as described in greater detail in Section 3 above. However, it should be noted that NCP 18 and AEE 22 may optionally not belong to the same party. For example, when unifying the intentions of Party A and Party B, NCP 18 of Party A may request from NCP 18 of Party B to forward a request of an automaton execution to AEE 22 of Party B. When the execution ends, AEE 22 of Party B returns either SUCCESS, i.e., the CA reached a final state, or FAILURE, i.e., the CA did not reach a final state. If AEE 22 returns SUCCESS, NCP 18 may optionally modify the EContract with the output of the executed CA.

Furthermore, AEE 22 may optionally continue to maintain a particular execution state, in case this execution state is requested later on, for example, for performing backtracking. Optionally and preferably, Constraints Solver 20 and AEE 22 are operated by each party, or client, for the second embodiment, and provide data to NCP 18 at the server which is acting as the trustee for the negotiations, in order to block access to certain information of the party, such as the constraints for example.

A Unifier 24 is again controlled by NCP 18 and supervises the unification process, as described in greater detail above with regard to Section 4. Unifier 24 is preferably operated by the server for the second embodiment of FIG. 10, in which the server is the trustee for the negotiations. Briefly, the unification process involves the unification of at least two, but optionally more, intentions submitted by NCP 18 of a party A and the corresponding NCP of a party B. If it succeeds, Unifier 24 returns the EContracts. Unifier 24 may optionally occasionally request NCP 18 to pass a set of constraints to the constraint solver or to pass a CA to AEE 22 for execution. AEE 22 may optionally be AEE 22 of either Party A or Party B.

Figure 12:
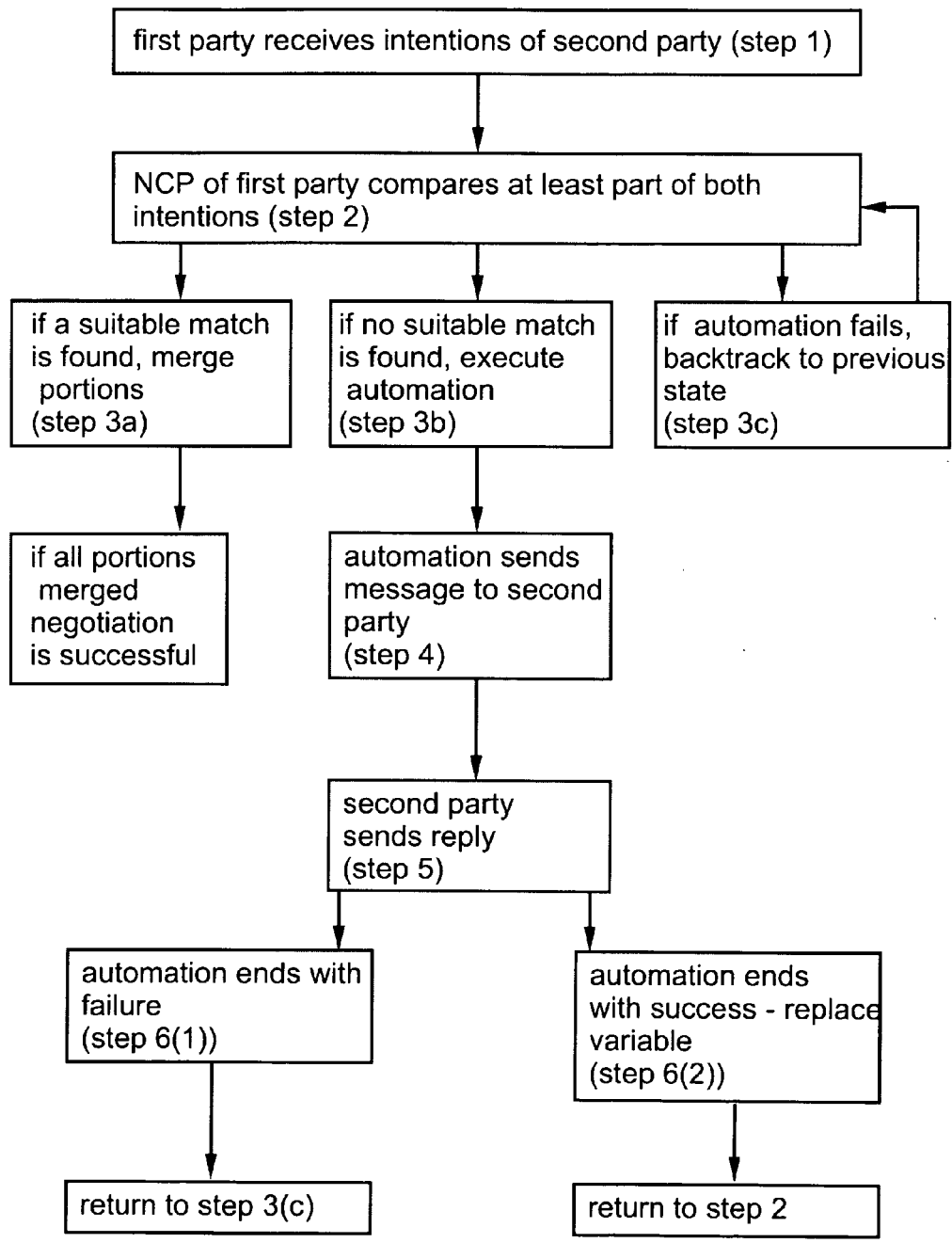
FIG. 12 is a flowchart of a method according to the present invention.

One example of a method for operating the system of FIG. 11 is explained in greater detail below, with regard to the flowchart of FIG. 12. The description of this method refers to "two parties", it being understood that these are two separate party machines 12, which could optionally be located at two separate clients, at a client and at the server, or alternatively both could be located at the server. In step 1, preferably the first party receives a copy of the intentions data structure 16 of the second party. In step 2, NCP 18 of the first party compares at least a portion of intentions data structure 16 for the first party to intentions data structure 16 for the second party.

In step 3a, if a suitable match is found between the two portions, preferably they are merged to form a third merged intention data structure 16. Steps 2 and 3a are performed again at least once, and optionally and preferably are performed until the third intentions data structure 16 is complete, such that both the first and the second intentions data structures 16 have been merged.

Alternatively, in step 3b, if a suitable match is not found, but at least one portion is associated with an automaton, then AEE 22 controlling that automaton is executed. In step 4, optionally and preferably, the automaton sends a message to a corresponding negotiation automaton of the other party. If there is no corresponding negotiation automaton, then the is sent to NCP 18 of the other party. The message may optionally include a suggested change in a value for one or more variables, and selecting from among a list of possible values for one or more variables.

In step 5, NCP 18 and/or corresponding negotiation automaton of the other party sends a reply, which may optionally confirm the suggestion, make a choice, or make a counter-offer, for example. Steps 4 and 5 are optionally repeated at least once. After this exchange of messages, the automaton ends execution either successfully or with failure, in step 6 (1). If execution ends with failure, preferably step 3c is now performed. If execution ends successfully, the generated output instance replaces the variable that was previously associated with the automaton in step 6 (2). The method then optionally and preferably returns to step 2.

Also alternatively, in step 3c, if a suitable match is not found and there is no associated automaton, then preferably backtracking is requested by NCP 18, to return the third intentions data structure 16 to a previous state. If such a previous state is found, then the process continues from step 2. Otherwise, the process ends.

If all, or at least an acceptable fraction, of the portions of the first and the second intentions data structures 16 can be merged, then the negotiation process concludes as a success. Otherwise, it fails.

If unification fails, backtracking is optionally performed. Unifier 24 then preferably reviews previous actions and attempts to achieve unification by finding an alternative path to match the intentions of both parties, as described below in greater detail.

According to an alternative embodiment of the present invention, as described in the third example of FIG. 10 above, both the server and each party may hold party machine 10 for conducting negotiations. Alternatively, the server may hold all components of party machine 10, with the optional exception of those parts described above, and may conduct negotiations with itself, both on behalf of another party and as a client.

According to a preferred embodiment of the present invention, an intention can be translated from a data structure such as a tree into natural human language of one or more parties. This is done by associating each class with a descriptive human language sentence with place-holders for the values of variables. These place-holders are then completed once the values for the variables have been determined during the process of negotiation. At the end of the process, the negotiated agreement can be so constructed in a natural human language, by reading out each sentence and filling in the determined values for the variables. The structure may optionally be nested, such that a place-holder may itself be filled with a class, which in turn has its own description and place-holders, and so forth.

Section 6

Translating Users' Constraints and Preferences into Mathematical Programs

This Section describes preferred embodiments of the present invention, which relates to a specific method of translating (or compiling) users' specifications into mathematical programs. The specific forms of mathematical programs we consider are the well-known Goal Programs [6, 7, 8, 10, 11] as well as their multiplex generalization [10]. The constraint solver can handle a wide variety of goal programs including linear, non-linear, integer goal programs.

A basic underlying idea of Goal Programming is that often constraints are not stringent and many times users have achievement of specific less restrictive goals. Goal programming is an especially useful technique when users have multiple, and sometimes conflicting, objectives. Goal programming provides two basic techniques for goal specification: prioritization and weighting (per priority level). Using these tools a user can indicate the relative importance of constraints, preferences and goals.

We now outline the technique for compilation of intentions. The starting point is user specification of a deal and elicitation of constraints and preferences. This is usually done using a graphical user interface, GUI; it can also be done textually (whether GUI is used or some other form of input, we will talk about the GUI level as the level at which preferences are specified). In what follows we concentrate on what is specified and only touch upon some aspects of how the specification is done when it has direct bearing on the material presented.

GUI Level. There are a number of ways for obtaining the relative importance of constraints and preferences:
1. Direct specification at the GUI level.
2. Questions & Answers at the GUI level. This may be accompanied by a structured technique such as the Analytic Hierarchy Process (AHP) [9].
3. Presentation of examples and discerning the user's goals based on which ones are preferred.
4. Observed user behavior over time. Based on past deals the user's preferences are determined.
5. Market "wisdom" as obtained through general surveys, which may be processed using traditional Conjoint Analysis or via methods such as the Analytic Hierarchy Process (AHP) [9].

In general, a deal specification may result in a number of contexts. Each new specification can be global within the current context or create a new context. Consider the following example. If one specifies the condition $(X<15)$ OR $(X>20)$, then one can state that these alternatives will apply to all derived contexts. Alternatively, one can state that this specification should split the current context into two separate contexts, one with $(X<15)$ and one with $(X>20)$. In the latter case, the current context is duplicated and the continuation of specification will be done separately in each context at the GUI level. The end result is that we may have a number of contexts. Each such context may give rise to one or more intentions. Each of these intentions is preferably handled separately.

When duplicating an intention at the GUI level, an importance priority is assigned to each by-product. Importance priority indicates that each deal resulting from a higher priority intention is more important than each deal resulting from a lower priority intention. If such priorities cannot be assigned to resulting deals, a presentation priority is assigned to each by-product. Presentation priority is used in presenting resulting deals from these intentions to the submitter.

In what follows we discuss a single intention and how a deal is negotiated for it. We start by assuming that the intention contains no disjunction, that is the use of OR (alternatives). Then, we shall consider handling disjunction.

Top level specification. The result of processing at the GUI level is a series of specifications. These are then translated into run-time code that implements the user's wishes as expressed at the GUI level. We shall list the constructs available at the top level and the way each is translated. We will then explain how the translation can be used as a foundation for carrying automated negotiations. Finally, we outline the complete compilation procedure. Specific mechanisms for employing this foundation are described in Section 7. Section 8, in turn, discusses dynamic changes in negotiation parameters.

Specification at the top level uses the following building blocks:
1 Variables, e.g. integer X, float Y.
2 Hard constraints, of the form expression θ value, where expression is a function involving variables, θ is a comparison ($<, \leq, =, \geq, >$), and value is a real number; e.g. $X+3Y<17$. The function θ may be linera or non-linear.
3 Soft constraints take the form soft (expression θ value).
Intuitively, these constraints are less stringent than hard constraints. When θ is = we call the soft constraint a target constraint. The relative importance of deviations from target may be indicated, e.g., exceeding a target is three times as important as under-achieving the target.

4. Preferences are of the form maximize expression or minimize expression. For example, minimize (2X−3y+Z).

5. Alternatives take the form (expression θ value) OR (expression θ value). For example, (X>17) OR (Y<9Z).

6. Rules are of the form IF expression θ value THEN expression θ value. For example, IF X>17 THEN PRICE<1200. We can view such a rule as a form of an alternative (disjunction). They are mentioned here mainly for completeness.

7. Priorities indicate that one entity (which may be a hard constraint, soft constraint, target, alternative or preference) is more important than another entity. This is an ordinal specification. Usually priorities are numbered 1, 2, 3, etc., with the understanding that 1 is the highest priority, then 2, etc. Observe that priority 1 entities are considered absolutely more important then priority 2 entities, which in turn, are considered absolutely more important than priority 3 entities, etc.

8. Weights: indicate, within a priority level, the relative importance of an entity relative to others. This is a cardinal specification. In case of target constraints, an option is to provide two weights, one for deviation below and one for deviation above; if not specified these deviations are considered equally unwanted.

9. Integral constraints, e.g., integer (X1), indicate that an expression needs to be evaluated to an integer. Generally, such constraints imply the usage of techniques for handling integers, such as the well-known branch and bound (see Chapter 11 in [10]).

Building blocks. The general idea is to use the technique of goal programming (G), suitably adjusted, to represent the constraints and preferences of a deal. We shall first discuss how constituent elements are handled, and then proceed to a simple intention, then to intentions containing usage of disjunction(s). The general form of a GP program is as follows: lexicographically_minimize {Expression 1, ..., Expression m} such that for i=1, ..., k we have goal constraints, gi, of the form:

$$c_iX+(D_i-) \geq t_i, \text{ or}$$

$$c_iX-(D_i+) \leq t_i, \text{ or}$$

$$c_iX+(D_i-)-(D_i+)=t_i,$$

and, in addition we have the constraint that all $D_i$'s$\geq 0$, and, optionally, some $D_i$'s=0 (indicating hard constraints)

The Di variables are called aeviation variables; those of the form (Dj+) indicate an amount by which a goal is exceeded ("overshooting"), whereas those of the form (Di−) indicate under-achievement of goals. The Expression j's are called minimization expressions. The term lexicographically minimize (lex_min for short) implies an order on minimization, where the results of the Di's, of minimizing up to Expression i are used as values in Expression i+1, ..., Expression m. So, the lower index expressions have a higher priority. Each Expression may refer to decision variables (X's), to deviation and other variables and to weights. Note that one may enforce hard constraints by setting some deviation variables to zero. For example, to enforce a $\geq$ type constraint one may set (Di−)=0.

Here is an example of a simple goal program, taken from reference [6].

Minimize:Priority 1((D1−)+(D2−)+(D3+))Priority 2(D4+)Priority 3(D5−).

$X1+X2+(D1-)-(D1+)=30$ $X3+X4+(D2-)-(D2+)=30$ $3X1+2X3+(D3-)-(D3+)=120$ $3X2+2X4+(D4-)-(D4+)=20$ $10X1+9X2+8X3+7X4+(D5-)-(D5+)=800$ $X1,X2,X3,X4,(D1-),(D1+),(D2-),(D2+),(D3-),(D3+),(D4-),(D4+)\geq0$ We now explain how to transform the user's specifications into a GP program. Then, we shall explain how to use such programs during negotiations.

1. Variables:

Variables are associated with atomic valued intention nodes. Variables are typed. The type may be integer or float. Variables may also be associated with discrete values as follows. Consider a variable that is associated with a color, which may be red, green, blue or yellow. Each color is associated with a value, e.g., red=1, green=2, blue=3 and yellow=4.

An important idea is that of a default interval, according to which each variable is associated with a default interval. This interval is used for choosing default values. It also makes all variables range-bounded. The default interval may be a single point or a collection of ranges of values. Default values are also used when the constraints are not satisfied with the current set of variable assignments (this is an alternative to backtracking). Default intervals may be user specified or be derived from a database. A default interval is considered a hard constraint and is added to the other constraints. Choosing a value from a default interval may be done in a number of ways: minimize, maximize, percentage off maximum, average, random, etc.

2. Hard Constraints:

A hard constraint involving '<' or '>' is transformed into a hard constraint involving '$\leq$' or '$\geq$', respectively, by subtracting (respectively, adding) a small quantity. A hard constraint, of the form expression θ value, is compiled into expression+(D−)−(D+)=value Depending on hardness, we may add constraints (D+)=0 for θ='$\leq$' or (D−)=0 for θ='$\geq$' and (D−)=(D+)=0 for θ='='. If hardness is more "limited" we may add a goal to minimize, of the highest priority, whose content is (D−)+(D+). The understanding is that at the highest priority minimization expression should evaluate to zero. Alternatively, we may simply derive a goal of the form LARGE*(D−), or LARGE*(D+) or LARGE*(D−)+LARGE*(D+) and treat it according to its weight. This latter form increases feasibility of a solution. Here LARGE is a sufficiently large value in the domain considered.

3. Soft Constraints:

A soft constraint of the form expression θ value is compiled into expression+(D−)−(D+)=value.

For example, consider the constraint soft (Qty=20). It is compiled into Qty+(D1−)−(D1+)=20, Here, again, we use deviation variables. In fact, such constraints express preferences, namely being close to the target. In case a deviation in the direction (D1−) is, say, four times as undesirable as a deviation in the direction (D1+), then:

Case 1: The soft constraint is assigned a priority and it is the only one at its priority level. This means we should minimize 4(D1−)+(D1+).

Case 2: Otherwise, we need to normalize this constraint so that we can compare it to other constraints. We use the idea of percentage deviation.

1. Define (Dp1+)=(D1+)/target and (Dp1−)=(D1−)/target.
2. What we minimize is the expression minimize (A*(Dp1−)+(1−A)*(Dp1+), [0≦A≦1] e.g., minimize (0.80*(Dp1−)+0.20*(Dp1−)).
3. If, in addition, the overall weight of this soft constraint is W, then we will minimize the minimization expression minimize (W*2)[0.80*(Dp1−)+0.20*(Dp1+)]. W*2 is an estimate, as only one (Dpi) variable will contribute to the result, evidently the other will be set to zero in solving the goal program.

Now consider a constraint of the form expression≦ value. It is compiled as above into:

expression+(D−)−(D+)=value.

Here the goal to minimize is W*(Dp1+), where W and (Dp1+) are as above. The cases of θ='≧', '>', '<' are handled similarly.

4. Preferences:

We allow minimization (min) or maximization (max) preferences on functions, e.g., min 2*X+5*Y. We can also give such preference a weight, indicating its importance. For example (W1 is the weight): W1: minimize: 2*X+5*Y.

This preference is compiled as follows. First, an "optimistic" yet "reasonable" target for the minimization is determined (by using default intervals, user specification or solving a simplified linear program). For example, if a reasonably optimistic small value for the above expression is 100, the preference is restated as the soft constraint: W1: 2*X+5*Y≦100.

From this point on, it is treated as an ordinary soft constraint. As stated, the value, 100 in the example may be determined by using another linear program with the minimization objective as the only objective.

Preferences can also be applied to variables corresponding to discrete values. For example, suppose we prefer red, green, blue and yellow in that order. Further, suppose we rate our preferences on a scale from 1 to 100. We can model this using the soft constraints:

100: Color=1
50: Color=2
20: Color=3
20: Color=4

We also add the hard constraints:

Color≧1
Color≦4
integer(Color)

This formulation of soft constraints will favor the more preferred targets.

Recall that in general we have a number of preferences, each translated into a soft constraint, say $P_0, \ldots, P_k$. These, and the "original", soft constraints are partitioned into a number of priority levels. Priority levels are handled one by one using lexicographic minimization. Conceptually, the results of minimization at level i, that is, minimization expressions of higher priority, are inserted as constraints in the minimization at level i+1. Consider again the example goal program above. If we solve it using a linear programming package, we first present the highest-level linear program:

Minimize:(Expression of Priority 1)((D1−)+(D2−)+(D3+))

$X1+X2+(D1-)-(D1+)=30$ $X3+X4+(D2-)-(D2+)=30$ $3X1+2X3+(D3-)-(D3+)=120$ $X1,X2,X3,(D1-),(D1+),(D2-),(D2+),(D3-),(D3+)\geq0$ $(D1-),(D1+),(D2-),(D2+)\leq30$ $(D3-),(D3+)\leq120$ Solving, we discover that the result is ((D1−)+(D2−)+(D3+))=0. We therefore form the next level linear program as:

Minimize:(Expression of Priority 2)1(D4+)

$X1+X2+(D1-)-(D1+)=30$ $X3+X4+(D2-)-(D2+)=30$ $3X1+2X3+(D3-)-(D3+)=120$ ((D1−)+(D2−)+(D3+))=0(This is the "newly fed" constraint.)

$3X2+2X4+(D4-)-(D4+)=20$ $X1,X2,X3,X4,(D1-),(D1+),(D2-),(D2+),(D3-),(D3+),(D4-),(D4+)\geq0$ $(D1-),(D1+),(D2-),(D2+)\leq30$ $(D3-),(D3+)\leq120$ $(D4-),(D4+)\leq20$ The solution turns out to be (D4+)=10. This is "fed" into yet one more (f) linear program that optimizes 10X1+9X2+8X3+7X4.

The remaining issue is how to compile a single priority level.

There are two basic methods:

Method 1: All the soft constraints within a priority level are compiled into a single expression to be minimized, by summing up the individual minimization expressions compiled for each soft constraint in isolation.

Method 2: Use the min-max [8] idea of treating each soft constraint in isolation and then bounding the maximum deviation on any particular soft constraint. Assume we have a total of K minimization expressions corresponding to K soft constraints at priority level j. This is compiled into an overall minimization objective for level j:

min Q expression part of minimization expression 1<Q

. . .

expression part of minimization expression K<Q

Observe that the result will tend to minimize more the important soft constraints, that is, those with larger weights. The advantage in min-max is more flexibility and minimization of missed goals. Observe that each minimization expression is already percentage-wise and weight-wise normalized. There are advantages and disadvantages to each method. We can preferably run the user's intention in parallel in two versions, one using Method 1 and one using Method 2. We can also decide on Method i (i=1 or i=2) as default and allow the user to change it for a particular run.

5. Alternatives:

If we have (A OR B) and also (C OR D) then each of the four combinations is acceptable, that is AC, AD, BC, and BD. With a disjunction like (A OR B) we can have a different weight for A and a different weight for B. The idea is to consider the resulting entity (intention containing disjunction instances) as one entity for the purpose of evaluation. Thus, within the matching algorithm, in backtracking, if at a certain point the combination of constraints is infeasible, we may backtrack over the set of alternative-type constraints. Note that this is mainly appropriate for feasibility type constraints. To realize this possibility we need to introduce constraints into the intention tree (to make backtracking easy) and also construct the goal program dynamically within the unification algorithm.

One problem is that if we do satisfy the "current feasibility set" other sets are not necessarily explored (unless we exhaustively backtrack over all possibilities). If not all are explored, during negotiations, we may be "locked in" optimizing within one feasible sub-region. Also, if we do exhaustively backtrack we are within a "single thread" of control, had we duplicated, we could have worked in parallel on several intentions. Unlike comparing general contexts, here comparing duplicates makes more sense, as they are all essentially the "same" optimization problem.

Yet another way to handle disjunction is by employing integer variables, and using them to "simulate" if-then-else. The disadvantage is that the constraint solver need employ costly techniques; the advantage is that the complexities are confined to the constraint solver, and all possibilities for optimization are explored.

6. Foundations for Negotiations:

Whereas Goal Programming (GP) is a known technique, our use of it is novel. We use the framework provided by GP to help in carrying out inter-tool automated negotiations.

We begin by listing the basic problems we need to solve in order to enable automated negotiations:

1 Suggest a tuple of values when asked to provide one.
2 Choose from a number of alternative tuples of values; we can choose more than one by repeatedly applying choose.
3 Rank tuples of values according to their desirability. This ability is needed when evaluating intentions. Rank is implemented via choose.
4 Suggest an "improvement" to an input tuple of values, which improvement improves the "score" of the input tuple. This is needed when improving a suggested deal.

We may also need to handle a situation in which we have an offer, from the other party, that is not feasible. We need to "convert" such an offer into a feasible one, such that it retains, as much as possible, its "goodness". This situation may also happen in a negotiation setting in which sides tell each other their overall value function (as represented by their goal program) as well as constraints they have (or portions thereof), yet some constraints remain untold and therefore the other party may come up with an infeasible offer.

Next, we explain how to handle the basic problems by using a goal program representing the user's wishes (as an optimization problem). The idea is to modify the entries of a tuple of values (associated with variables), so as to improve or degrade the tuple. The modification is indicated via its mode. Modes can be of two kinds, overall or per-level:

Overall (Weighing). A weighting factor for each priority level is specified. This allows flexibility in specifying trade-offs among the different levels. It allows us to view the whole goal program as giving rise to a single value function. In this case, the improvement (or degradation) is specified in overall-percentage-improvement. To achieve the improvement, the overall value function must decrease by the indicated percentage (degradation is handled similarly).

Per Level. For each priority level, a percentage improvement i specified. To achieve this improvement, the minimization at each priority level must decrease by the indicated percentage for the level.

A. Suggest a Tuple of Values:

If the optimization problem is infeasible, offer a default-selected tuple of values. Otherwise, solve the goal program. Observe that as this procedure may be called when only a portion of the variables are bound to actual values, there may be a range of possibilities of values of variables that are feasible. Get the values for the variables in question from the solution of the goal program. If nothing else is specified, return an "optimal" tuple, according to the user's preferences, as the one to suggest.

Otherwise, form a particular tuple of values based on additional criteria provided to this operation such as: best, percent-off-best-per-level, overall-percentage-off-best, worst, average, any. These criteria are part of the user's profile for this interaction. In case of a linear goal program, the forming can be implemented using the following methods (choose methods based on the user's profile for this operation):

Percent-Off-Best-Per-Level

Method 1. Adding constraints per variable and analyzing dual variables (dual variables indicate how to improve the objective function by modifying constraints; see Chapters 8, 10 and 18 in [7]). This is done by adding to the goal program constraints of the form Xi=ai, where Xi is a variable associated with the i'th component of the optimal tuple, that is first computed, and ai is the value for that component. We then solve the resulting goal program, level by level. We examine the dual variables associated with the new constraints we introduced. To get a "lesser" tuple we need to modify the value associated with such a constraint so as to increase the (level's) objective function (recall that we minimize at the top). The amount of increase is according to the specification of percent-off-best-per-level applied individually per level. We change values of variables one by one, until the overall change, at the level, is according to the percentage specification.

Method 2: Adding a "level-wise constraint". Here we consider the minimized function at the particular level, say f(Di's). Assume the minimum value is f(Di's)=a. Based on the percent-off-best-per-level specification for this level, say p, let a'=a+|a|p, here | |indicates absolute value. Add a constraint of the form f(Di's)≧a', and solve the goal program at this level again. Use the results for the next level, where the same technique is applied. What we achieve is a "less optimal" solution of the original goal program as per the percentage specification per level. If at any point the goal program is not feasible we "undo" the last change by dropping the constraint introduced at the previous level.

A variation on Method 2, Method 2', is to add in a single action, for each level j, the constraints of the form f(Di's)=aj', and then solve the resulting level linear program. Again, in case of infeasibility, we drop a subset of the new constraints, or modify them, so that the result is feasible. The subset is chosen according to the user's profile, which indicates the order of dropping.

Overall-Percentage-Off-Best.

Methods 1, 2 and 2' with appropriate modifications may be applied for this criterion as well. The overall goal is used in method 1; a modified overall constraint is used in methods 2 and 2'.

Worst.

If worst is specified, we simply maximize, at each level, instead of minimize. Due to the default-intervals technique, if the problem is feasible then there is a bounded solution.

Average.

If average is specified, we calculate best and worst tuples and form the "average tuple" by setting each tuple position to the average of the values in that position in the best and worst tuples.

Any.

Any is implemented by randomly choosing in the intervals defined by the best and worst tuples in the respective positions.

In case of a non-linear goal programs we can search in the neighborhood of a solution for "less optimal" tuples.

B. Choose from a Number of Tuples of Values:

If the optimization problem is infeasible, offer a default value per tuple entry (i.e., variable), in case there are default ranges, choose one, which is "closest" to an offered alternative. Otherwise, solve the goal program and return a tuple out of those to choose from, which is "closest" to the goal program solution implied tuple. If more than one choice is required, get the next best choice, and so on. As default, the distance is measured as the average percentage deviation from the tuple, computed over all tuple components. There are other methods for calculating distance that the user may choose and thereby override the default, for example Euclidean distance where each coordinate is normalized to a range, say [1-100].

C. Suggest an Improvement to a Tuple of Values:

Suppose we are provided with no additional information from the GUI level concerning the order of importance of variables in improving tuples. This case is very similar to the case of producing "less optimal" tuples, with the exceptions that (i) the added tuple-generated constraints are based on the values of the tuple we are improving; and (ii) we are trying to decrease the level-wise minimization functions or overall value function. Therefore, we handle this case using the methods for suggesting a tuple that we have described above (in A). In Method 1, we add the current tuple values as constraints; as before, we use dual variables, this time to further minimize. In methods 2 and 2', we add the tuple values as soft (target) constraints with relatively low weights; as before, we also add constraints to decrease the minimization expressions, at each level, as compared to their current value.

Another issue is the possibility that the tuple we are trying to improve leads to an infeasible solution. In that case, rather than adding the tuple values as constraints of the form $Xi=ai$ (Method 1), we add them as soft constraints. Alternatively, we can use default values and improve them, that is, an "infeasible tuple" is replaced by a "default tuple" and is then improved.

Now, consider the case in which we are provided with additional information from the GUI level. This information is in the form of a list of variables, in the order of importance (for improvement purposes). Suppose the variables in the tuple are $X1, \ldots, Xn$. Let $a1, \ldots, an$ be the currently associated values. Assume that the order $1 \ldots n$ is also the order of weights that are associated with these attributes, that is, how important they are. We can apply the technique above, of adding constraints (Method 1), but do improvements one-by-one, starting with the most important variable and progressing to the least important one. We treat variables in that order until we meet our target improvement, overall value, or percentage-wise per level.

Alternatively, we can use the idea of relaxation. We relax the value for a variable, say $X1$, by adding the constraints, for $i=2 \ldots n$, $Xi=ai$. Intuitively, we "bind" all other variables and leave $X1$ "free". Now, we solve the resulting goal program. If the resulting program is feasible then we get a "better" value for $X1$. If this new value, say $a1'$, is reasonable (measured in percentage difference from $a1$) we move on to set $X1=a1'$ and apply relaxation next to $X2$. We repeat this process and end up with a new tuple of values to return. Note that as each variable is treated, the constructed tuple is "improved".

It is possible that in relaxing $X1$ we end up with an infeasible program due to settings of other variables. In that case we move on and apply relaxation to $X2$, and so on. If after relaxing all the $Xi$'s we still have an infeasible program then we default-select a tuple to return which is close, distance-wise, to the initial tuple we are trying to improve.

Observe that relaxation attempts a sort of gradient decent in a controlled way.

Summary: Process of Compilation of a Single Context

In what follows we consider the steps in compiling a single context that may involve disjunction.

1. Get the user's specification of deal from both deal, and item catalogs.
2. Build an intention—list of items, attributes, quantities, specifications concerning delivery and deal splitting.
3. Identify and scale atomic variables of interest.
4. Add any number of hard constraints.
5. Add any number of soft constraints.
6. Add choices out of a finite set of alternatives (e.g., color) with weights.
7. Add preferences (max, min, and desired values).
8. Add disjunction constraints and preferences.
9. Indicate priorities on preferences and soft constraints (ordinal). All hard constraints are at level 1 (highest).
10. Add weights (cardinal) relating preferences and constraints within each priority level.
11. Add integral constraints.
12. Obtain the method of combining objectives per priority level: for example, summation or min-max (which is the default).
13. Combine objectives into a lexical minimization problem where at each level the chosen method of combination is used.
14. Obtain the negotiation strategy to be employed and its parameters.
15. Partition the above into independent components (ICs). Each IC contains its own set of variables, preferences, constraints and objectives. That is, each IC can be handled independently of other ICs. For example, suppose we have W1: $X+Y<20$, W2: $2X-Y<7$, minimize $3X+4Y$, W3: $Z-W<8$ and W2: $Z+W<30$, maximize $2X+4Y$. We can construct two ICs for these constraint set, one made of the first three terms mentioning X and Y and the other of the rest. In forming ICs, a disjunction is considered as "connecting" all variables appearing within it, that is, they will appear in the same IC.
16. For each IC form the following functions:
17. Boolean isFeasible (current values of variables, set of constraints—hard and soft)
18. TupleofValues suggest_Tuple (list of variable names, current values of variables, set of constraints—hard and soft, suggestion mode)

19. Set of TupleofValues choose_Tuple (list of variable names, current values of variables, set of constraints—hard and soft, set of alternative tuples for variables, choice mode)
20. Ordered Set of TupleofValues rank_Tuples (list of variable names, current values of variables, set of constraints—hard and soft, set of alternative tuples for variables, choice mode)
21. TupleofValues improve_Tuple (list of variable names, current values of variables, set of constraints—hard and soft, improvement mode)
22. With each intention tree leaf variable, associate a commerce automaton (CA). In the automaton one can perform:
    Access to intention variables
    Simple arithmetic operations
    Database access using SQL
    Calls to IC functions as defined above
    Messages to the "other party"
    Add calls to user-defined functions (optional capability)
Automata have an associated input tree, an associated output tree, states and transitions.
1. With each IC, associate a negotiation automaton (NA) and construct it so that it can confirm, choose, suggest or improve tuples by using the IC functions. Attach the NA to the lowest node that is a parent of all the IC's variables. Attach a trivial NA to other nodes that simply transfers the message up the tree.
2. Based on the negotiation strategy, construct a negotiation control program (NCP). The NCP uses the procedure matchIntentions. This procedure performs unification on two intentions. During unification the above-mentioned functions are utilized. Backtracking is used to explore the space of possibilities. The unification is not necessarily in left-to-right order. A heuristic is to explore first highly "grounded" portions of the intention tree. Based on the negotiation mechanism, the NCP utilizes the negotiation API. The negotiation mechanism accesses the negotiation-oriented functions constructed during compilation (namely, to confirm, suggest, choose or improve tuples of values).
3. If necessary, customize backtracking to handle disjunction. This means, in particular, that one needs to construct the equation sets in real-time, the particular set depends on the alternatives used. This also means that some compilation activity needs to be done at run-time in combining the preferences associated with various alternatives.

Deal Splitting

In the GUI interaction, the user may indicate that deal splitting is acceptable. Deal splitting is the assignment of deal portions to various suppliers. Below we list some ways of splitting a deal.

Residual algorithm. Here the initial deal is submitted to the system. The system satisfies it as much as possible using best effort unification. What is left is considered as a "new" residual deal. The residual deal is submitted to the system and it is satisfied independently. Of course it may give rise, recursively, to more residual deals. The group of deals resulting from the original request needs to satisfy the initial deal constraints.

Published prices. Sometimes we have access to approximate or even exact pricing and availability tables. We may use these to form package deals. Such a deal simply indicates a sequence of (item, quantity, supplier, and price). One way to accomplish this is to form a (potentially large) set of linear constraints and solve them optimally using a standard solver.

Fishing. Here we submit a number of sub-deals to the system. Each such sub-deal represents a package. There are enough packages so that when we see the outcome, we can contemplate combining various packages to form the initial deal. Usually the initial deal itself will be one of the packages.

History. This is a variation on fishing. We examine historical deal data and specify possible sub-deal packages based on past deals.

Section 7

Negotiations

In this section we consider the post-matching phase. A user's desired deal is potentially translated into a set of intentions. Each intention is separately matched (unified) with relevant intentions. The matching may involve exchange of messages as well as database and external data accesses. At this point a deal may be finalized (either automatically or by human decision). Alternatively, the deal may be further negotiated upon. Intentions may be modified while negotiating with one or more parties. Finally, automated or human decision is reached. As presented in Section 6, NAs and the NCP can form responses to CAs' inquiries based on the procedures, which are constructed as negotiation infrastructure (Section 6). Let us summarize the negotiations scenario.

Once intentions are matched, a deal can be formed. However, in many cases the user would prefer to further improve the deal and, if there are multiple sellers, be able to use this fact in improving the deal. The manner in which post matching negotiations are carried out is called a trading mechanism, or simply a mechanism. The process is as follows:

The parties choose trading mechanisms; this is done at the GUI level.

During compilation, constraints and preferences are translated into goal programs (Section 6).

Procedures for choosing, ranking, improving and suggesting offers are produced (Section 6).

At run-time, an actual trading mechanism is selected. It uses the produced procedures. The mechanism is employed once an initial intention is formed, with each of the potential sellers (actually, the situation is symmetric if we consider a single seller and a number of potential buyers).

There are many possibilities for forming trading mechanisms. We concentrate on two basic types of mechanisms. The first is one-to-one (also called 1-1, or bilateral). The second is one-to-many (1-N). Another differentiation between mechanisms has to do with revealing information. We differentiate between mechanisms in which a party reveals all, or some, of its value function (goal program and how to weigh the priority levels, in our case) and mechanisms in which the party does not reveal information. We now present three basic mechanisms.

1-1 Without Revealing

This mechanism is designed for exactly two parties. In it, parties do not reveal their goal programs. Parties use negotiation parameters such as: risk taking, greediness, time allotted to direct their activities.

Once a basic deal is reached the parties move on to the deal improvement phase.

During this phase the parties may use backtracking to explore further deals. This may even lead to re-forming the basic deal they reached at the end of the intention-matching phase. Deal improvement is done as follows:

The parties use (GUI level specified) parameters to choose improvement amounts. These parameters include risk taking, greediness, time allotted.

1. A party generates a "better intention" using the deal improvement procedure (as per Section 6).
2. The party presents it to the other party.
3. The other party either agrees to continue improving, or presents a counter-offer.
4. The parties repeat improving the outstanding deal, based on the parameters.
5. Eventually, a decision is reached. The decision is reached when one of the parties declares that this is the last offer and asks the other party to either confirm or stop negotiating.

Observe that the above mechanism is symmetric in the sense that negotiations can be brought to conclusion by either party. We also foresee a variation in which only one of the parties has this ability.

1-1 With Revealing

In this mechanism the parties reveal either all, or parts, of their goal programs to the other party. Each party then constructs a combined goal program, which includes both goal programs. The idea is that each be aware of the needs of the other party. There are a number of ways in constructing the priority structure of the combined program:

1. Alternating levels – 1, 1', 2, 2' . . . . This gives high priority to the other party's important interests.
2. Layered – 1, 2, 3 . . . 1', 2', 3' . . . . This takes one party's interests first into account and only then the other party's interests.
3. Layering & alternation. A more flexible combination, e.g., 1, 1', 2, 3, 2'3', Consider a party that is about to improve an outstanding deal. Improvement is done in two steps. The combined program is used in a first step of deal improvement. Then, in a second optional step, the party modifies (that is, improves) the deal according to its own goal program. The latter program is optionally augmented with some of the constraints of the other party. This "double improvement" is designed to take into account the other party's interests as much as possible.

1-N Without Revealing

We note that the 1-1 mechanisms we have just discussed may be used in unstructured negotiations of a party with many parties. In this situation, one party (the "1") negotiates is a structured way with many parties (the "N"). This mechanism uses the 1-1 mechanism without revealing as a sub-program. It operates as follows. Following the basic deal formation via matching, the "1" has outstanding deals with each of the "N" parties. The mechanism is on rounds (late arrivals may be excluded from a particular round). The "1" ranks intentions at the beginning of each round. It sets improvement targets for each participant so that each participant must beat the previous round best deal. With high probability (a parameter) the "1" drops non-improving participants except for the best performer of the previous round. The "1" continues based on perceived improvements, and time limits. Target setting is a function of time. Deal improvement with each party is done as in the non-revealing 1-1 mechanism.

At some point (see below) the "1" decides on an end-game phase. This phase is performed as follows:

1. The "1" ranks the outstanding intentions.
2. The "1" sets improvement targets for each participant so that each beats the best deal of the previous round.
3. The "1" makes offers, one by one, to each of the "N" so that if a deal offer is accepted, a deal is sealed and negotiations are over.
4. Out of the "N", the one that proposed the best deal in the previous phase is asked first, then the second best, and so on. This creates extra motivation for the "N" parties.
5. If the "N" parties accepted no deal offer, the best deal from the previous phase is selected and sealed.

Section 8

Dynamic Negotiations

As presented thus far, a user U specifies his/her business intention(s). These are submitted to the system, which matches them with outstanding intentions (these may arrive at any point after submitting U's intentions). Intentions are associated with various parameters, which, as discussed in Section 6, are compiled (translated) into mathematical programs. These programs are used during the matching process and in the optional 1-1 or 1-N negotiation phase, as described in Section 7. In this section we allow running the above scenario while dynamically changing parameters. Parameter changing can be done through a GUI. In this case, while observing the state of negotiations, a party may decide to change the values of some parameters. Parameters can be associated with the deal itself, for example, the maximum price a party is ready to pay. Parameters may also be associated with the negotiation process, for example, the overall time allotted.

Changing some parameters at run-time can be implemented by replacing associated values in the intentions and the compiled goal programs. It may necessitate goal program re-compilation. If active negotiation sessions have already used the 'old' parameters during matching, they may have to be backtracked. In some cases, changes may necessitate re-forming of goal programs. In this case, a currently active negotiation session using such a goal program may have to be backtracked to a previous phase. For example, in 1-N negotiation, the session may be brought from the 1-N rounds to the 1-1 phase.

Figure 13:
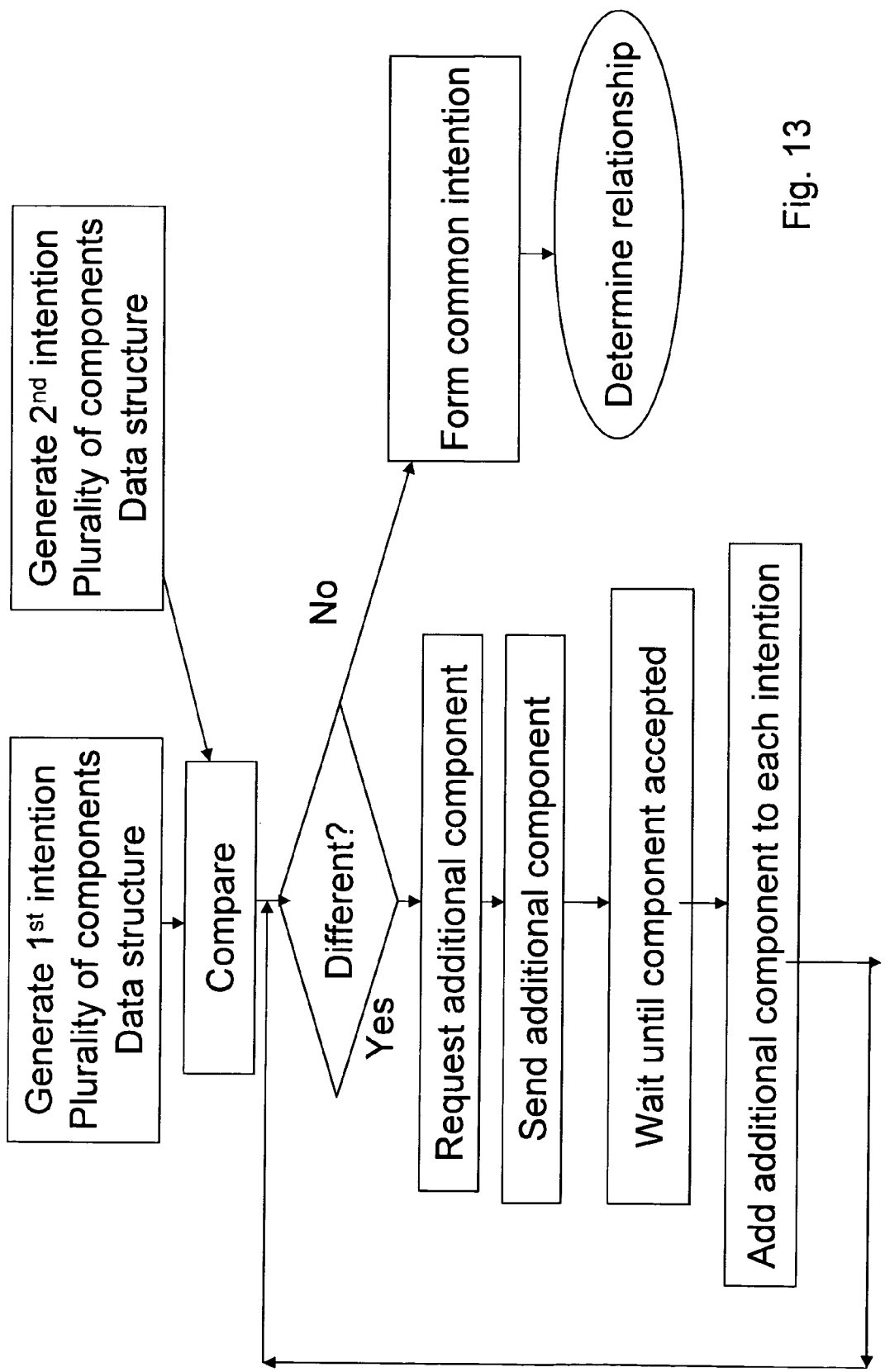
FIG. 13 is a flowchart of a further method according to an embodiment of the present invention.

Reference is now made to FIG. 13 which illustrates a method according to an embodiment of the present invention. As shown in FIG. 13, a method for at least semi-automatically directly negotiating a relationship between at least a first user party and a second user party, involves user parties at respective computational devices connected over a network, the relationship relating to components. The method involves firstly electronically generating a first intention for the first user party at a first computation device and a second intention for the second user party at a second computational device, each of the intentions featuring various components and being in accordance with an intention data structure.

The method proceeds to electronically compare the two intentions. When the two intentions are different then a negotiation procedure is entered. The method electronically provides for one of the computational devices to define an additional component for the intention of the first user party.

A message including the additional component is sent to the second party.

It is electronically determined when the additional component is accepted by the second party.

When the additional component is accepted by the second party, then each party adds the additional component to the intentions.

The comparison is repeated, and when the two intentions match then the method electronically merges the two intentions to form a common user intention, and determines the relationship according to the common user intention. The common user intention is also in accordance with the intention data structure.

Figure 14:
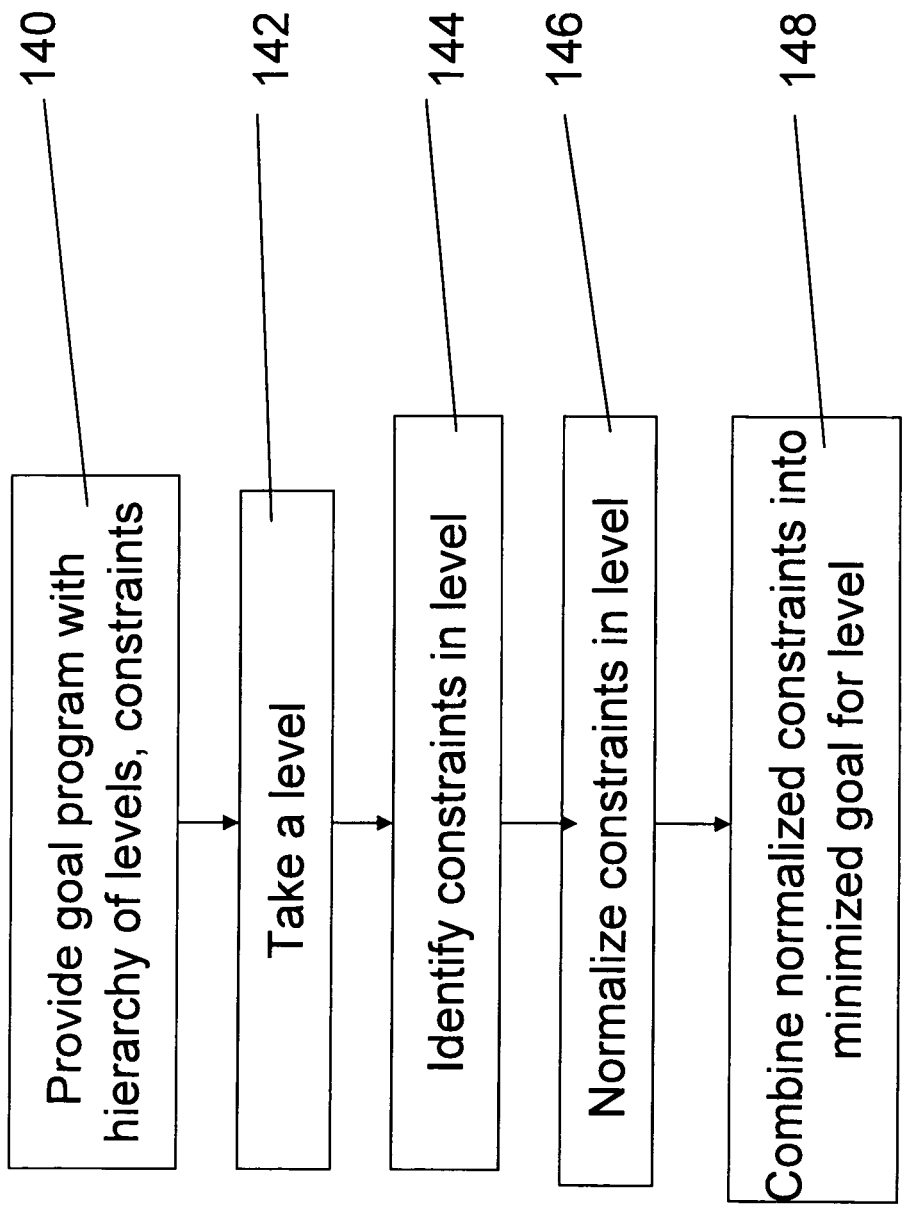
FIG. 14 is a flowchart of a yet further method according to an embodiment of the present invention.

Reference is now made to FIG. 14 which is a simplified diagram illustrating a method according to a further embodiment of the present invention. A method is illustrated of creating a minimizing goal for a level within a goal program comprising a hierarchy of levels, for at least semi-automatically directly negotiating a relationship between at least a first user party and a second user party, the parties being at respective first and second electronic computers connected over a network.

The method comprises a stage 140 of providing electronically to the parties at the electronic computers over the network a goal program having multiple levels in a hierarchy, at least some of the levels including constraints. This is followed by 142 taking a level and then 144 electronically identifying constraints within a respective level. At box 146 the constraints identified are electronically normalized to render the identified constraints mutually comparable, so as to obtain normalized constraints at the electronic computers. Finally a stage 146 is carried out of electronically combining the normalized and thus mutually comparable constraints to create a minimized goal for the current level at the electronic computers. The result is a level within the hierarchy having a minimized goal and thus providing levelwise solution of the goal program.

Reference is now made to FIG. 15, which is a flow chart illustrating yet another embodiment of the present invention. In FIG. 15, a method is illustrated of at least semi-automatically directly negotiating a relationship between two or more user parties at respective computers connected over a network. The method comprises providing a first intention for the first user party and a second intention for the second user party being stored within an intention data structure, the intentions respectively featuring a plurality of components. A dispatch is then exchanged between the processor of the first user party and the processor of the second user party including a reference to a value for one of the components. Based on the referenced value the method then electronically generates a merged portion within the intention data structure. Then the method alters one of the intentions using the merged portion. Now following alteration the two intentions are compared. If the intentions match then the relationship is determined according to the merged portion. Otherwise a further dispatch is exchanged.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

BIBLIOGRAPHY

1. R. Fikes, R. Engelmore, A. Farquhar, and W. Pratt. Network-based information brokers, 1995. See http://www.ksl.stanford.edu/KSL_Abstracts/KSL-96-18.html as of Jan. 2, 2000.
2. M. Klusch, ed., Intelligent Information Agents., Springer-Verlag, 1999.
3. S. Bottcher. Open nested type structures and partial unification for searching in distributed electronic market. In Proc. TrEC'98, 1998.
4. D. Kapur. *Principles and Practice of Constraint Programming*, chapter An Approach for Solving Systems of Parametric Polynomial Equation, pages 217-243. The MIT Press, 1995.
5. Kim Marriott, Peter J. Stuckey. *Programming With Constraints: An Introduction*, The MIT Press, 1999.
6. James P. Ignizio *Goal Programming and Extensions*. Lexington Books, 1976.
7. James P. Ignizio. *Linear Programming in Single & Multiple Objective Systems*. Prentice-Hall, 1982.
8. Ralph E. Steuer. *Multiple Criteria Optimization: Theory, Computation and Application*. John Wiley & Sons, 1986.
9. Thomas L. Saaty. *The Analytic Hierarchy Process: Planning Setting Priorities, Resource Allocation*. Pittsburgh, Pa.: RWS Publications, 1990.
10. James P. Ignizio, Tom M. Cavalier. *Linear Programming*. Prentice-Hall, 1994.
11. Marc J. Schniederjans. Goal Programming Methodology and Applications. Kluwer Academic Publishers, 1995.

APPENDIX

Unification Algorithm

The input of the unification algorithm is two intention trees I1 and I2. C is the set of local constraints defined on I1 and I2. We assume that I1 and I2 do not contain OR vertices.

The algorithm is described in a Prolog-like language. We assume the existence of the following predicates:

instance(T,S) Generates an isomorphic copy S of T with a disjoint set of variables including association to automata).
var(V) Satisfied if V is an unbound variable.
nonvar(V) Satisfied if V is not an unbound variable.
atomic(V) Satisfied if V is an atomic variable.
class(V) Satisfied if V is a class variable.
int(V), float(V), string(V) Satisfied if V is ground and is an integer (float, string, resp.).
mode(V,Structure,Type) Satisfied if variable V has the structure Structure (Structure can be: atomic, class or list) and type Type (Type can be: int, float, string or a class name).
bassert(Edb) Backtractable assertion of the fact Edb.
bretract(Edb) Backtractable retract of the fact Edb.
classDesc(C1, C2) Class C1 is a descendant of class C2 in a class hierarchy of an ontology.
automaton (V, A, O, ModeStmts) Satisfied if automaton A is assigned to V, its output instance is O and O's mode statements are ModeStmts.
run(A,O) Execute automaton A on instance O.
checkConstraints(T,C) Satisfied if the variables in T satisfy the constraints set C.
permute([X1, . . . Xn], [Y1, . . . Yn]) Satisfied if (Y1, . . . Yn) is a permutation of (X1, . . . Xn). Backtracking generates the "next" permutation.
ground(V) Satisfied if variable V has a non-null value.

The Unification Algorithm follows:

```
/*Main*/
/*We assume that a fact (clause) is asserted prior to running
the unification, for each of the variables in the input intentions
I1
and I2, in the following way:
assert(mode(variable name, structure, type)).*/
/*Run Unification; the result is I1.*/
main_unification(I1,I2)<--unify(I1,I2),
    checkConstraints(I1,C), write(I1).
/*Use symmetry.*/
unify(I1,I2)<--unify1(I1,I2).
unify(I1,I2)<--unify1(I2,I1).
/*Unifying 2 Classes.*/
unify1(T1,T2)<--nonvar(T1), nonvar(T2),
    T1=CN1(E1-C1, ..., Ek-Ck),
    /*CNi is class name, Ei is edge label to subtree Ci.*/
    T2=CN2(F1-D1, ..., Fk-Dk),
    class(CN1), class(CN2),
    CN1=CN2, E1=F1, ..., Ek=Fk,
    unify(C1,D1), ..., unify(Ck, Dk).
/*Unifying 2 Lists.*/
unify1(T1,T2)<--nonvar(T1), nonvar(T2),
    T1=List(C1, ..., Ck), T2=List(D1, ..., Dk),
    permute([C1, ..., Ck], [X1, ..., Xk]),
    unify(X1,D1), ..., unify(Xk, Dk).
/*Unifying a List and a superset constraint.*/
unify1(T1,T2)<--nonvar(T1), nonvar(T2),
    T1=List(C1, ..., Ck), T2=CO(D, ..., Dm),
    m<k, /*T1's elements must include T2's.*/
    permute([C1, ..., Ck], [X1, ..., Xk]),
    unify(D1,X1), ..., unify(Dm, Xm).
/*Both T1 and T2 are rooted at a NOT vertex.*/
/*There is no need to unify T1 and T2.*/
unify1(,T2)<--nonvar(T1), nonvar(T2),
    T1=NOT(ST1),
    T2=NOT(ST2),
    !.
/*T1 is rooted at a NOT vertex.*/
unify1(T1,T2)<--nonvar(T1),
    T1=NOT(ST1),
    not(unify(ST1,T2)).
/*T1 is rooted at an AND vertex*/
unify1(T1,T2)<--nonvar(T1),
    T1=AND(ST1,ST2),
    unify(ST1,T2), unify(ST2,T2).
/*only list rules for integer constants and variables. Similar
rules apply for the float and string atomic data types.*/
/*2 constants*/
unify1(T1,T2)<--
    int(T1), int(T2), T1=T2.
/*Assigning a constant to a variable.*/
unify1(T1,T2)<--var(T1),
    mode(T1, atomic, int), int(T2),
    bretract(mode(T1, atomic, int)),
    T1=T2.
/*2 atomic variables.*/
unify1(T1,T2)<--var(T1), var(T2),
    mode(T1, atomic, int),
    mode(T2, atomic, int),
    bretract(mode(T2, atomic, int)),
    T1=T2.
/*Assigning a class instance to a class variable.*/
unify1(T1,T2)<--var(T1), nonvar(T2),
    mode(T1, class, X),
    T2=CN(E1-C1, ..., Ek-Ck), class(CN),
    classDesc(CN,X), /*CN is subclass of X.*/
    bretract(mode(T1, class, X)),
    T1=T2.
/*2 class variables.*/
unify1(T1,T2)<--var(T1), var(T2),
    mode(T1, class, X),
    mode(T2, class, Y),
    classDesc(Y, X),
    bretract(mode(T1, list, X)),
    T1=T2.
/*Assigning a list to a list variable.*/
unify1(T1,T2)<--var(T1), nonvar(T2),
    mode(T1, list, X),
    T2=List(C1, ..., Ck),
    /*Need to check whether the list variable and the list's
    items have compatible types*/
    bassert(mode(A1, Z1, X)), ...,
    bassert(mode(Ak, Zk, X)),
    unify(A1,C1), ..., unify(Ak,Ck),
    Z1<>list, ..., Zk<>list,
    bretract(mode(T1, list, X)),
    T1=T2.
/*A list variable and a superset constraint.*/
unify1(T1,T2)<--var(T1), nonvar(T2),
    mode(T1, list, X),
    T2=CO(C1, ..., Ck),
    /*No unification is done, the constraint is noted*/
    bassert(constraint(CO, T1, T2)).
/*2 list variables.*/
unify1(T1,T2)<--var(T1), var(T2),
    mode(T1, list, X),
    mode(T2, list, Y),
    classDesc(Y, X),
    bretract(mode(T1, class, X)),
    T1=T2.
/*Unifying an automaton variable.*/
unify1(T1,T2)<--
    automaton(T1, A, O, ModeStmts),
    bassert(ModeStmts), unify(O,T2), /*Prepare automaton "inputs"*/
    run(A,O),
```

```
/*We abstract by running the automaton in the same environ-
ment, when run remotely we'll export part of the environment
and then re-install a version of it, based on the remote execu-
tion*/ unify(O, T1).

/*Special case: unification of 2 superset constraints.*/ unify1(T1,T2)<--nonvar(T1), nonvar(T2),
    T1=CO(C1, . . . , Ck),
    T2=CO(D1, . . . , Dm),
    /*No unification is done, constraints are noted.*/
    bassert(constraint(CO, T1, T2))
```

Note that if unbound variables appear in a subtree rooted at a NOT vertex, it is possible for the unification algorithm to fail while reaching an agreement was in fact possible. This problem arises because the unification order is fixed by Prolog and does not take into account that unification with subtrees rooted at NOT vertices may be done after all the relevant variable bindings are determined. In such a case, it is possible to modify the intention trees so that the standard order of unification leads to a correct result.

The invention claimed is:

1. A method for at least semi-automatically directly negotiating a relationship between at least a first user party and a second user party, the parties being at respective first and second computers connected over a network, the computers comprising processors, the method being carried out on said processors and comprising the steps of:
    (a) providing a first intention for the first user party and a second intention for the second user party stored at memories of said respective processors, each of said first intention and said second intention being stored within an intention data structure, the intentions respectively featuring a plurality of components;
    (b) over said network, exchanging at least one dispatch between the processor of the first user party and the processor of the second user party, said at least one dispatch including a reference to a value for at least one of said plurality of components;
    (c) electronically generating a merged portion, said merged portion also being within said intention data structure, said generating a merged portion being according to said reference to said value in said at least one dispatch, said electronically generating comprising within a respective data processor merging at least a portion of said first user intention and at least a portion of said second user intention, said portions comprising the said at least one of said respective components to which said value refers;
    (d) using said data structure, electronically altering at least one of said first intention for the first user party and said second intention for the second user party with said merged portion;
    (e) electronically comparing said first user intention to said second user intention; and
    (f) when said first user intention matches said second user intention, electronically determining the relationship according to said merged portion.

2. The method of claim 1, wherein said reference to said value is selected from the group consisting of a variable component, an actual value, a request for a value from said second party, and a request to select a value from a set of values for said second party.

3. The method of claim 1, wherein said reference to said value is determined by a compiled goal program which encodes constraints, preferences and negotiation parameters of said first or said second intentions.

4. The method of claim 3, wherein said compiled goal program is used to create at least one procedure selected from the group consisting of
    (i) suggest a tuple of the form (v0, . . . , vn) of values;
    (ii) choose from a number of alternative tuples of values;
    (iii) rank tuples of values according to a desirability; and
    (iv) suggest an improvement to an input tuple of values.

5. The method of claim 1, wherein said step of negotiating said relationship between said at least said first party and said second party is effected, at least in part, using a structure selected from the group consisting of one-to-one with or without revealing and one-to-many without revealing.

6. The method of claim 3, wherein at least two goal programs are combined to form a combined goal program, which encodes said constraints, said preferences and said negotiation parameters of at least said first or said second intentions.

7. The method of claim 2, wherein said variable component is associated with a predefined default interval.

8. The method of claim 7, wherein said default interval is associated with at least one value, at least one range of values or a combination of at least one value and at least one range of values.

9. The method of claim 1, wherein step (c) is performed by merging at least a portion of said first intention and at least a portion of said second intention to form a merged portion, such that the relationship is defined according to said merged portion.

10. The method of claim 9, wherein only a portion of said first intention and only a portion of said second intention are merged to form the relationship.

11. The method of claim 9, wherein an entirety of said first intention and an entirety of said second intention are merged to form the relationship.

12. The method of claim 9, wherein said first intention and said second intention are incomplete, such that step (b) further comprises the steps of:
    (i) defining at least one computational device for adding at least one suggested component to at least one intention;
    (ii) executing said at least one computational device to obtain said suggested component; and
    (iii) sending a message from the first party to the second party, said message including a suggested component according to said at least one computational device.

13. The method of claim 12, wherein said dispatch of step (b) also includes said first intention of said first party and is sent from said first party to said second party, such that said second party adds said suggested component to said merged portion.

14. The method of claim 13, wherein step (b) further comprises the step of:
    (iv) determining by said second party whether to accept said suggested component.

15. The method of claim 13, wherein step (b) further comprises the step of:
    (iv) providing a value for said suggested component by said second party.

16. The method of claim 9, wherein said first intention and said second intention are incomplete, such that step (b) further comprises the steps of:
    (i) defining at least one computational device at the second party for adding at least one suggested component to at least one intention;
    (ii) executing said at least one computational device to obtain said suggested component; and
    (iii) sending a message from the second party to the first party, said message including a suggested component according to said at least one computational device.

47

17. The method of claim 9, wherein step (b) further comprises the step of:
 (i) providing a value for at least one component by said second party.

18. The method of claim 1, wherein said component also includes a constraint for restricting said value.

19. The method of claim 18, wherein said constraint determines that said value is not alterable.

20. The method of claim 18, wherein said constraint determines that said value is alterable, such that step (b) further comprises the step of sending a return message with a counter offer for altering said value of said at least one variable by at least one of the first party and the second party.

21. The method of claim 18, wherein step (c) further comprises the step of removing at least one constraint from at least one component.

22. The method of claim 1, wherein step (d) further comprises the step of saving a state of each of said first intention and said second intention to form a previous state, before altering said first intention and said second intention, the method further comprising the step of:
 (g) when said first intention does not match said second intention, returning said first intention and said second intention to said previous state.

23. The method of claim 1, the method further comprising the step of:
 (g) when said first intention matches said second intention, notifying each party of acceptance of the relationship.

24. The method of claim 1, wherein said first intention and said second intention are each constructed as a first intention tree and a second intention tree, respectively, such that step (e) is performed by comparing said first tree to said second tree.

25. The method of claim 24, wherein step (c) is performed by merging at least a portion of said first tree and at least a portion of said second tree to form a merged tree, such that the relationship is defined according to said merged tree.

26. The method of claim 25, wherein only a portion of said first tree and only a portion of said second tree are merged to form the relationship.

27. The method of claim 25, wherein an entirety of said first tree and an entirety of said second tree are merged to form the relationship.

28. The method of claim 1, wherein each component is constructed from a set of shared classes for the first party and the second party.

29. The method of claim 1, wherein the relationship is determined as a contract, said contract featuring a plurality of intentions, such that steps (a)-(f) are performed for each of said plurality of intentions.

30. A system comprising a plurality of computers connected over a network, for at least semi-automatically directly negotiating a relationship between a plurality of user parties in respect of components taking a value, the system comprising:
 (a) said computers connected over said network respectively including a plurality of user party modules, each comprising programs and data at said respective ones of said plurality of computers, the modules including at least a first user party module and a second user party module, data at each user party module featuring a respective user intention configured within and according to an intention data structure, the respective user intentions being for determining the relationship, said user intentions respectively featuring a plurality of components in common to be determined for the relationship and respective values, such that a process of negotiation by at least one of said first and second user party modules through said intention data structure matches said user intention of said first user party module to said user intention of said second user party module to provide a value agreed between users for said plurality of components; and
 (b) a central server connected to said plurality of computers over said network, the central server being a computer, the central server being configured for at least initially connecting at least said first user party module to at least said second user party module for performing said direct negotiations to reach said agreed value, said negotiating comprising generating within said system a common user intention according to said intention data structure by merging of said respective user party intentions.

31. The system of claim 30, wherein at least said first party module features a plurality of intentions for negotiating with a plurality of parties.

32. The system of claim 31, wherein said central server further comprises a server party module for performing said negotiations on behalf of at least one party.

33. The system of claim 32, wherein only said server party module performs said negotiations on behalf of a plurality of parties.

34. The system of claim 31, wherein said central server further comprises a server party module for performing said negotiations on behalf of said central server as a broker.

35. The system of claim 31, wherein said party modules perform said negotiations and said central server only initially connects said first party module to said second party module.

36. The system of claim 31, wherein at least one party module features at least one computational device for generating a suggested alteration to said intention according to at least one rule, such that if said first intention does not match said second intention, said suggested alteration is generated by said at least one computational device.

37. The system of claim 36, wherein at least one party module further features at least one computational device for determining if said suggested alteration is accepted.

38. A method for at least semi-automatically directly negotiating a relationship between at least a first user party and a second user party, said user parties being at respective computational devices connected over a network, the relationship relating to components, the method being performed by a data processor, the method comprising:
 (a) electronically generating a first intention for the first user party at a first computation device and a second intention for the second user party at a second computational device, each of said first intention and said second intention featuring a plurality of components and being in accordance with an intention data structure;
 (b) electronically comparing said first intention to said second intention;
 (c) when said first intention is different than said second intention, electronically providing for one of said computational devices to define an additional component for the intention of at least the first user party;
 (d) electronically sending at least one message from the first party computational device to the second party computational device over said network, said at least one message including said additional component;
 (e) electronically determining when said additional component is accepted by the second party;
 (f) when said additional component is accepted by the second party, then within said respective computational devices electronically adding said additional component to said first intention for the first party and to said second intention for the second party to provide respective intentions that comprise said additional component;

(g) repeating step (c) at least once; and (h) when said first intention matches said second intention, then electronically merging the respective first and second intentions to form a common user intention, and determining the relationship according to said common user intention, said common user intention also being in accordance with said intention data structure.

39. The method of claim 38, wherein steps (c) to (h) are repeated at least once.

40. For use in a system for at least semi-automatically directly negotiating a relationship between a first user party and a second user party, each of the first user party and the second user party having a first user intention and a second user intention, respectively such that the relationship is negotiated by matching the first user intention and the second user intention, a device operated by at least one of the first user party and the second user party, the device comprising a memory, a processor, a first party user interface and a second party user interface, said memory, said processor:

(a) said memory comprising an intention data structure, said intention data structure being configured for holding said intentions such that the respective user intentions are held within and in accordance with said intention data structure;

(b) said processor comprising a negotiation control program and configured for controlling a process of negotiation between said users via said respective user interfaces; and (c) said processor comprising a unifier, associated with said negotiation control program, configured to unify said user intentions via said intention data structure of said memory component, said unifier being implemented within said processor, via said process of negotiation between users, said negotiation being via said user interface to form a merged user intention, said merged user intention also being within said data structure, said merged user intention unifying said respective first and second intentions, therefrom to define the relationship in accordance with said data structure.

41. The device of claim 40, wherein said intention data structure includes at least one constraint, the processor further comprising:

(d) a constraint solver for solving said at least one constraint.

42. A method of creating a minimizing goal for a level within a goal program comprising a hierarchy of levels, for at least semi-automatically directly negotiating a relationship between at least a first user party and a second user party, the parties being at respective first and second electronic computers connected over a network, the method comprising the steps of:

(a) providing electronically in a manner accessible to said parties at said electronic computers over said network a goal program having a plurality of levels in a hierarchy, at least some of said levels including constraints;

(b) electronically identifying constraints within a respective level at said electronic computers;

(c) electronically normalizing each of said identified constraints respectively to render said identified constraints mutually comparable, so as to obtain normalized constraints at said electronic computers; and (d) electronically combining said normalized and thus mutually comparable constraints to create said minimized goal for said level at said electronic computers, thereby to provide a level within said hierarchy having a minimized goal and thus providing levelwise solution of said goal program.

* * * * *